United States Patent
Zornes

(10) Patent No.: US 7,946,346 B2
(45) Date of Patent: May 24, 2011

(54) SUPERCRITICAL FLUID RECOVERY AND REFINING OF HYDROCARBONS FROM HYDROCARBON-BEARING FORMATIONS APPLYING FUEL CELL GAS IN SITU

(76) Inventor: David Allen Zornes, Sammamish, WA (US)

(*) Notice: Subject to any disclaimer, the term of this patent is extended or adjusted under 35 U.S.C. 154(b) by 229 days.

(21) Appl. No.: 12/307,585

(22) PCT Filed: Jul. 3, 2006

(86) PCT No.: PCT/US2006/026184
§ 371 (c)(1),
(2), (4) Date: Jan. 5, 2009

(87) PCT Pub. No.: WO2007/018844
PCT Pub. Date: Feb. 15, 2007

(65) Prior Publication Data
US 2010/0163226 A1 Jul. 1, 2010

(51) Int. Cl.
*E21B 43/24* (2006.01)
(52) U.S. Cl. ............ 166/309; 166/272.1; 166/302; 166/371
(58) Field of Classification Search .............. None
See application file for complete search history.

(56) References Cited

U.S. PATENT DOCUMENTS 4,473,114 A * 9/1984 Bell et al. ............ 166/248
4,928,765 A * 5/1990 Nielson ............ 166/251.1

* cited by examiner

*Primary Examiner* — Zakiya W. Bates

(57) ABSTRACT

A plume of combined gases are infused into hydrocarbon-bearing formations, "inert" as the major gas and "reactive" as the minor gas, where the minor gas reacts with hydrocarbons to fully saturate hydrocarbons with supercritical fluid, which migrate hydrocarbons out of formations, even at great distances from the regulated fuel cell source. Coal, tar sands, petroleum-contaminated soil, and/or oil wells that have lost gas pressure can also be desorbed by this in-situ method.

12 Claims, 11 Drawing Sheets

| Fuel Cell Type | Electrolyte | Anode Gas | Cathode Gas | Temperature | Efficiency |
|---|---|---|---|---|---|
| Proton Exchange Membrane (PEM) | solid polymer membrane | hydrogen | pure or atmospheric oxygen | 75°C (180°F) | 35–60% |
| Alkaline (AFC) | potassium hydroxide | hydrogen | pure oxygen | below 80°C | 50–70% |
| Direct Methanol (DMFC) | solid polymer membrane | methanol solution in water | atmospheric oxygen | 75°C (180°F) | 35–40% |
| Phosphoric Acid (PAFC) | Phosphorous | hydrogen | atmospheric oxygen | 210°C (400°F) | 35–50% |
| Molten Carbonate (MCFC) | Alkali-Carbonates | hydrogen, methane | atmospheric oxygen | 650°C (1200°F) | 40–55% |
| Solid Oxide (SOFC) | Ceramic Oxide | hydrogen, methane | atmospheric oxygen | 800–1000°C (1500–1800°F) | 45–60% |

Fig. 4

SUPERCRITICAL FLUID RECOVERY AND REFINING OF HYDROCARBONS FROM HYDROCARBON-BEARING FORMATIONS APPLYING FUEL CELL GAS IN SITU

TECHNICAL FIELD

The present invention is generally directed to applying a combination of gases and waste steam produced from fuel cells to increase production in oil and natural gas fields by infusion of stable nitrogen diamers ($N_2$) combined with traces of hydrocarbon-reactive nitrogen compounds into hydrocarbon-bearing formations, which violently react (micro-bursts of energy) with hydrocarbons, compressing nitrogen into supercritical fluid (SCF) cells with orders of magnitude more penetration into hydrocarbons than would naturally form from nitrogen diamers migration alone. A plume of combined gases are infused into hydrocarbon-bearing formations, "inert" as the major gas and "reactive" as the minor gas. The minor gas reacts with hydrocarbons to fully saturate hydrocarbons with SCF that migrates hydrocarbons out of formations, even at great distances from the regulated fuel cell source. When potential supercritical gases and fluids are already naturally in situ within the formation, only a hydrocarbon-reactive compound needs to be infused into the hydrocarbon formation.

BACKGROUND OF THE INVENTION

Any natural geologic hydrocarbon formations that have porosity and permeability that allow hydrocarbons to migrate are target locations for this invention. A fuel cell technology is applied to electrochemically separate nitrogen from air and then pressurize nitrogen diamers and nitrogen compounds through hydrocarbon formations. Where nitrogen compounds violently react with hydrocarbons, a large number of SCF nucleation sites are formed from the instant compression of nitrogen diamers ($N_2$) into supercritical nitrogen ($scN_2$).

SCF cells form when hydrocarbon-reactants violently react (micro-bursts of energy) with hydrocarbons, because gas molecules travel only short distances in straight lines before they are deflected in a new direction by collision with other gas molecules that are further confined inside the small pores (in geology a small space that is surrounded by rock or soil and filled with hydrocarbon gases, fluids and solids) of natural hydrocarbon formation rock and soil that includes fluid and solid fills. The gas velocity formula below can be applied under the kinetic-molecular theory of gases to explain why open gas permeable formations that have very small or low porosity can still have gas and liquids phase into instances of SCF cells. Prior SCF art does not teach that open porous geologic formations can provide the environment for a SCF event to move hydrocarbons out of the formation. SCF oil and gas recovery focuses on breaking down the hydrocarbons for movement, by minimizing or limiting chemical reactions to SCF formation.

The kinetic-molecular theory (KMT) of gases can be stated as four postulates:

1. A gas consists of molecules in constant random motion.
2. Gas molecules influence each other only by collision; they exert no other forces on each other.
3. All collisions between gas molecules are perfectly elastic; all kinetic energy is conserved.
4. The volume actually occupied by the molecules of a gas is negligibly small; the vast majority of the volume of the gas is empty space through which the gas molecules are moving.

Gas Velocity Explained

The root mean square velocity of a molecule can be obtained by using the formula $$vrms = (3RT/M)^{1/2}$$

Example: Calculate the root-mean-square velocity of oxygen molecules at room temperature, 25° C. M is the molecular mass of oxygen which is 31.9998 g/mol; the molar gas constant is 8.314 J/mol K, and the temperature is 298.15 K. The molecular mass must be divided by 1000 to convert it into a usable form, therefore $$vrms = (3(8.314)(298.15)/(0.0319998))^{1/2} = 481.2 \text{ m/s}$$

So an oxygen molecule travels through the air at 481.2 m/s which is 1726 km/h, much faster than a jetliner can fly and faster than that of most rifle bullets.

The very high speed of gas molecules under normal room conditions would indicate that a gas molecule would travel across a room almost instantly. In fact, gas molecules do not do so. If a small sample of a very odorous (and poisonous) gas, H2S is released in one corner of a room, our noses will not detect it in another corner of the room for several minutes unless the air is vigorously stirred by a mechanical fan. The slow diffusion of gas molecules which are moving very quickly occurs because the gas molecules travel only short distances in straight lines before they are deflected in a new direction by collision with other gas molecules.

The distance any single molecule travels between collisions will vary from very short to very long distances, but the average distance that a molecule travels between collisions in a gas can be calculated. This distance is called the mean free path of the gas molecules. If the root-mean-square velocity is divided by the mean free path of the gas molecules, the result will be the number of collisions one molecule undergoes per second. This number is called the collision frequency of the gas molecules.

The postulates of the KMT of gases permit the calculation of the mean free path of gas molecules. The gas molecules are visualized as small hard spheres. Without going into the mathematical detail; as the temperature raises the mean free path increases; it also rises as the pressure decreases, and as the size of the molecules decrease. Taking all this into account, the oxygen molecules from above has a mean free path of 67 nm. Diffusion takes place slowly because even though molecules are moving very fast, they travel only short distances in any one straight line.

This invention teaches that a propellant is a material used to move an object by applying a motive force provided after a SCF penetration into hydrocarbons. This may or may not involve a chemical reaction. It may be a gas, liquid, plasma, or, before the chemical reaction, a solid. As some gas escapes to expel the hydrocarbons in a formation, more new SCF forms back pressure as liquid evaporates into new gas, maintaining a motive force of pressure. Pressure acts in all directions at a point inside a gas. At the surface of a gas, the pressure force acts perpendicular to the surface forcing gases, liquids, and solids out of the formation.

This invention teaches spontaneous reactions (in opposition to non-spontaneous reactions) do not need external perturbations (such as energy supplement at the oil well borehole) to happen at a great distance from the infusion of reactants at borehole. An irreversible reaction is one in which nearly all of the reactants (minor gas) are used to form products. These reactions are very difficult to reverse even under extreme conditions. Although all reactions are reversible to some extent, this invention focuses on reactions that can be classified as irreversible. A reaction is called spontaneous if it thermodynamically causes a net increase on global entropy. In a hydrocarbon bearing formation at chemical equilibrium, it is expected to have larger concentrations of the substances formed from SCF forming back pressure as liquid evaporates into new gas in the spontaneous direction of the reaction, maintaining a motive force of pressure away from the reactant source borehole. Every chemical reaction is, in theory, reversible. In a forward reaction the substances defined as reactants are converted to products. In a reverse reaction products are converted into reactants. Chemical equilibrium is the state in which the forward and reverse reaction rates are equal, thus preserving the amount of reactants and products. A reaction in equilibrium can be driven in the forward or reverse direction by changing reaction conditions such as temperature or pressure elevated by SCF formation. Le Chatelier's principle can be used to predict whether products or reactants will be formed from reactions that form SCFs.

Le Chatelier's Principle can be summarized: When a chemical system at equilibrium experiences a change in concentration, temperature or total pressure the equilibrium will shift in order to minimize that change. The principle is used by chemists in order to manipulate the outcomes of reversible reactions, often to increase the yield of reactions.

Concentration of an ingredient will shift the equilibrium to the side that would reduce that change in concentration. This can be illustrated by the equilibrium of carbon monoxide and hydrogen gas, reacting to form methanol.

$$CO + 2H_2 \leftrightarrow CH_3OH$$

Suppose we were to increase the concentration of CO in the system. Using Le Chatelier's principle we can predict that the amount of methanol will increase, decreasing the total change in CO.

Temperature: Let us take for example the reaction of nitrogen gas with hydrogen gas. This is a reversible reaction, in which the two gases react to form ammonia:

$$N_2 + 3H_2 \leftrightarrow 2NH_3 \quad \Delta H = -92 \text{ kJ/mol}$$

This is an exothermic reaction when producing ammonia. If we were to lower the temperature, the equilibrium would shift in such a way as to produce heat. Since this reaction is exothermic to the right, it would favour the production of more ammonia. This reaction is used in the Haber process, which is a good example of the way chemists use Le Chatelier's principle.

In a Total Pressure manipulation we can refer to the reaction of nitrogen gas with hydrogen gas to form ammonia:

$$N_2 + 3H_2 \leftrightarrow 2NH_3 \quad \Delta H = -92 \text{ kJ/mol}$$

Note the number of moles of gas on the left hand side, and the number of moles of gas on the RHS. We know that gases at the same temperature and pressure will occupy the same volume. We can use this fact to predict the change in equilibrium that will occur if we were to change the total pressure.

Suppose we increase total pressure on the system, now by Le Chatelier's principle the equilibrium would move to decrease the pressure. Noting that 4 moles of gas occupy more volume than 2 moles of gas, we can deduce that the reaction will move to the right if we were to increase the pressure.

Nitrous oxide ($N_2O$), ammonia ($NH_3$), and hydrazine ($N_2H_4$) are nitrogen compounds that are target gas and violently react with hydrocarbons. Nitrous oxide or ammonia or hydrazine or nitric acid ($HNO_3$) compounds will react with hydrocarbons. Ammonia and hydrazine react explosively with petroleum.

Nitrogen tetroxide (or dinitrogen tetroxide) ($N_2O_4$) is a hypergolic propellant often used in combination with a hydrazine-based rocket fuel. The combination was used to fuel the Titan rockets used in the Gemini missions, and it is still used today in the second stage engines of Delta II rockets. By the late 1950s, it became the storable oxidizer of choice for rockets in both the USA and USSR.

Nitrogen dioxide is made by the catalytic oxidation of ammonia: steam is used as a diluent to reduce the combustion temperature. Most of the water is condensed out, and the gases are further cooled; the nitric oxide that was produced is oxidized to nitrogen dioxide, and the remainder of the water is removed as nitric acid. The gas is essentially pure nitrogen tetroxide, which is condensed in a brine-cooled liquefier.

Nitrogen tetroxide is a liquid that is easily vaporized. It is a powerful oxidizer and is highly toxic and corrosive. It is not affected by mechanical shock and does not react with air. Nitrogen tetroxide is always in equilibrium with nitrogen dioxide ($NO_2$), and some nitrogen dioxide will be present in any quantity of nitrogen tetroxide (higher temperatures push the equilibrium towards nitrogen dioxide). Nitrogen tetroxide reacts with water to form nitric acid.

Reactions of Nitric Acid

Dinitrogen pentoxide, $N_2O_5$, is best prepared by dehydrating concentrated nitric acid, $HNO_3$, by phosphorus pentoxide, $P_2O_5$.

$$2HNO_3 + P_2O_5 \Rightarrow N_2O_5 + 2HPO_3$$

Nitric oxide, NO, is prepared by the action of copper, Cu, or mercury, Hg, on dilute nitric acid, $HNO_3$, and was called nitrous air.

$$3Cu + 8HNO_3 \Rightarrow 3Cu(NO_3)_2 + 2NO + 4H_2O$$

Nitrogen dioxide, $NO_2$, is a mixed acid anhydride and reacts with water to give a mixture of nitrous and nitric acids.

$$2NO_2 + H_2 \Rightarrow HNO_2 + HNO_3$$

If the solution is heated, the nitrous acid decomposes to give nitric acid and nitric oxide.

$$3HNO_2 \Rightarrow HNO_3 + 2NO + H_2O$$

Sulphur dioxide, $SO_2$, and nitrogen oxides, $NO_x$, are toxic acidic gases, which readily react with the water in the atmosphere to form a mixture of sulphuric acid, nitric acid, and nitrous acid as acid rain.

Nitrates are the salts of nitric acid and are strong oxidizing agents.

The Oswald Process is the three-stage process by which nitric acid is manufactured. First, ammonia, $NH_3$, is oxidized at a high temperature (900° C.) over a platinum-rhodium catalyst to form nitrogen monoxide, NO.

$$4NH_3 (g) + 5O_2 (g) \Rightarrow 4NO (g) + 6H_2O$$

The nitrogen monoxide, NO, cools and reacts with oxygen, $O_2$, to produce nitrogen dioxide, $NO_2$.

$$2NO (g) + O_2 \Rightarrow 2NO_2 (g)$$

Finally, the nitrogen dioxide, $NO_2$, reacts with water and oxygen, $O_2$, to produce nitric acid, $$4NO_2 (g) + 2H_2O (l) + O_2 \Rightarrow 4HNO_3 (l)$$

All oxides of nitrogen are polar covalent compounds. The lower oxides of nitrogen are neutral oxides. The higher oxides of nitrogen are acidic oxides. The oxides of nitrogen are formed during high temperature combustion, and are present in exhaust gases from these processes. The principal oxides of nitrogen, $NO_x$, are nitrous oxide, nitric oxide, nitrogen dioxide, nitrogen pentoxide, and dinitrogen tetroxide. Combustion emissions are typically optimized to reduce $NO_x$. This invention teaches that high temperature combustion processes can be modified to produce higher volumes of oxides of nitrogen that are reactive with hydrocarbon, under pressure of exhaust, and can be infused into hydrocarbon formations to form SCF and propulsion of hydrocarbons out of the formation. A combustion engine, fuel cell, or turbine can be modified to optimize the production of combustion $NO_x$ emissions to a volume high enough to reinject into a geologic formation. Piston, combustion chamber, fuel to air mixtures, exhaust, intake, and pollution controls can be removed to accomplish this gas supply in an engine. Turbine intake, exhaust, fuel to air mixtures, turbine speed, operating temperatures, and pressures can be reduced in efficiency to produce high $NO_x$ emission for injection into oil formations. An alternative to fuel cells, Air Liquide of Houston Tex. USA provides FLOXAL™ solutions (FLOXAL™ Nitrogen, FLOXAL™ Oxygen, FLOXAL™ Hydrogen and FLOXAL™ Air), which are adapted in real time to production volume requirements, paying attention to continuity of supply.

A general solubility property of gases (a behavior described by Graham's Law and by Dalton's Law of Partial Pressures) is that they diffuse to fill the volume in which they are contained. Gases have neither fixed shape nor fixed volume; therefore, gases that do not react with each other are infinitely soluble in each other in all proportions due to this power of diffusion. SCF form from gas species and progress to combine with liquids that are in an SCF state, forming one solution that penetrates hydrocarbon solids at nearly 100 percent, moving the hydrocarbons with the greatest efficiency.

A gas that dissolves in a liquid with which it does not react is uniformly distributed throughout the volume of the solvent, and its behavior is described by Henry's Law. Generally, the solubility of a gas that is only slightly soluble in a solvent decreases with increasing temperature. Hydrogen, nitrogen and oxygen are non-polar and are only slightly soluble in water. In the case of these three gases, the gases continue to exist as covalent molecules in solution and there is no significant alteration to the structure of the molecules of gas. Hydrogen and nitrogen make the ideal SCFs because of this behavior.

A polar covalent gas that dissolves in a polar solvent often undergoes chemical reaction with the solvent, and significant changes to the structure of the molecules of the gas occur in solution (e.g. the polar covalent gas ammonia is very soluble in water and in aqueous solution, ammonia exists as an ammonium ion, $NH_4(+)$, having extracted a hydrogen ion from a molecule of water). Ammonia, $NH_3 + H_2 \Rightarrow$ ammonium ion $NH_4(+)$ + hydroxyl ion $HO(-)$. The resulting solution is alkaline due to the existence of the hydroxyl ion in solution.

Hydrocarbon reactants other than nitrogen compounds are taught in this invention. Hydroxyl radicals act like a detergent (and can be carried in suspension as a neutral solution), reacting with carbon monoxide, methane, and other hydrocarbons and so oxidizing them to form scWater and scCarbon dioxide miscible SCFs in situ. Hydroxyl radicals reactions move hydrocarbons out of formation, and are significant replacements for other gases (or liquids) when there is too much water for anhydrous ammonia to adsorb. Alternative SCF reactions are important, because nature is not the same for each geologic formation. Water alone can be removed from the ground from the infusion of hydroxyl radicals.

Hydroxide is a polyatomic ion consisting of oxygen and hydrogen:

It has a charge of −1. Hydroxide is one of the simplest of the polyatomic ions. The term hydroxyl group is used to describe the functional group —OH when it is a substituent in an organic compound. Organic molecules containing a hydroxyl group are known as alcohols (the simplest of which have the formula $CnH_2n+1$-OH). A group of bases containing hydroxide are called hydroxide bases. Hydroxide bases will dissociate into a cation and one or more hydroxide ions in water, making the solution basic. Hydrogen hydroxide is another name for water, as is hydrohydroxic acid. Both names are based on the hydroxide ion. The hydroxyl radical, OH, is the neutral form of the hydroxide ion. Hydroxyl radicals are highly reactive and consequently short lived. Most notably, hydroxyl radicals are produced from the decomposition of hydro-peroxides (ROOH).

This invention focuses on providing the process of SCF only when hydrocarbons are present, which offers a wide range of solvent power at a great distance from the source, chemical selectivity, environmental control, economics, and safety. This invention uses SCFs as an environmentally acceptable alternative to conventional solvents for reaction chemistry in hydrocarbon oil and gas recovery.

This invention teaches environmental control and safety by selecting reaction compound species for their entropy, enthalpy, and economy in volumes that react violently under the critical point in open spaces of the formation and above the critical point, forming SCF when the same reaction occurs in substantially higher density formations where the concentration, temperature, and pressure can produce a motive pressure. In many cases, the porosity, or open cavity, will be so great in volume that a SCF potential fluid will not form from a violent reaction, because the reaction zone cannot build pressure and temperature rapidly enough to move above the critical point. The violent reaction still develops pressure to move hydrocarbons out of a formation and is under the spirit of this invention where the reaction simply becomes a propellant to move hydrocarbons. This invention teaches an SCF forms from violent reaction (micro-bursts of energy) with hydrocarbons within the confinement of high-density porous hydrocarbon formations in which the substance at a temperature and pressure rises instantaneously above its thermodynamic critical point, penetrating and moving the hydrocarbons from the solvent penetrating energy power of an SCF. In nature there is an infinitely variable set of formation sizes, depths, porosities, formation materials, hydrocarbon mixtures, and quantities of each.

An SCF is any substance at a temperature and pressure above its thermodynamic critical point (FIG. 14). SCFs have the unique ability to diffuse solids, like a gas, and dissolve materials into their components, like a liquid. Furthermore, SCFs can readily change in density above the critical point and still remain in a supercritical state. Rapid expansion of supercritical solutions can lead to precipitation of a finely divided solid. SCF extraction is a process with properties that make SCFs suitable as a substitute for organic solvents. Carbon dioxide ($CO_2$) and water are commonly used as SCFs for this purpose. Supercritical $scCO_2$ (Tc=31.1° C., Pc=73.8 bar) closely resembles n-hexane in its solvating power, which can be further tuned by the addition of modifiers (including co-solvents and phase transfer catalysts) to afford the solubility characteristics required by the reaction selected for. Water's critical point occurs at around Tc=647 K (374° C. or 705° F.) and Pc=22.064 MPa (3200 PSIA), providing $scH_2O$. SCF is defined by the critical temperature and pressure of any substance. SCFs have solvent power similar to a light hydrocarbon for most solutes. Fluorinated compounds are often more soluble in $scCO_2$ than in hydrocarbons. Solubility increases with increasing density, which is provided from increasing pressure. Fuel cells require gases that are broken down from their original complex hydrocarbon to process the simple gas across the fuel cell membranes, and these complex hydrocarbons are broken down in situ by SCF's migration within the hydrocarbon formation.

Fluids such as supercritical xenon, ethane, and carbon dioxide offer a range of unusual chemical possibilities in both synthetic and analytical chemistry. Supercritical carbon dioxide is the most widely studied. Others include nitrogen, propane, propene, butane, xenon, ethane, and water. The effect is similar to a normalizing constant. The fluids are completely miscible with permanent gases (e.g. $N_2$ or $H_2$), and this leads to much higher concentrations of dissolved gases than can be achieved in conventional solvents. This effect is applied in both organometallic reactions and hydrogenation.

SCF modifier solvents: Small amounts of a second solvent can be added to the SCF. This can result in a change in solvent polarity and nature, which follows Snyder rules. This requires a proton donor (1-2-propanol), proton acceptor (2-acetonitrile), and dipole (3-dichloromethane). Synthetic organic chemists, inorganic chemists, physical chemists, and chemical physicists who employ a synergic blend of experimental, theoretical, and computational techniques can identify target compounds, attempt their synthesis on a laboratory scale, characterize new materials, and perform larger-scale synthesis of promising new species for formulation and application as SCFs to remove hydrocarbons from geologic formations. SCFs can be combined in any number of materials and can be synthetic or natural material combinations that will penetrate the hydrocarbon-bearing formation. Natural gases and decomposed hydrocarbons from hydrocarbon-bearing formations can be phased into SCFs as part of the supercritical process of extraction.

Robert Frisbee of Jet Propulsion Laboratory (JPL) researched ways of incorporating a little monatomic hydrogen into anything with even a little stability for application in ultra-high performance propulsion for planetary spacecraft. A selected list of propellants (adapted from Frisbee, 1983) demonstrates: solids (IUS(3) ≈ 3.0 m/s), monopropellants, bipropellants, and tripropellants, free radicals (unstable), and nuclear thermal (≈3500K). These propellants are man-made for rocket propulsion; in contrast, oil recovery is natural and will have many more gas species grouped together in excess of tripropellants as part of SCFs and propellants. The high number of natural gas species in the infinitely variable hydrocarbon-bearing formations and the conversion of many of these gases into propellants above tripropellants is part of the teaching of this invention. The following is a list of organic and inorganic propellants that can be produced from SCF inside hydrocarbon formations to move them out of the formation. These propellant compounds with such positive enthalpies are explosive in situ when combined. Some of the propellants are too large and explosive to apply ($10CH_2 + 72NH_4ClO_4 + 18Al$) in situ and others are small enough and have a low enough enthalpy to move into the formation porosity to form SCF within the formation permeability. Pure fluorine ($F_2$) is a corrosive pale yellow gas that is a powerful oxidizing agent. It is the most reactive and electronegative of all the elements and readily forms compounds with most other elements. Fluorine even combines with the noble gases, krypton, xenon, and radon. Even in dark, cool conditions, fluorine reacts explosively with hydrogen. In a jet of fluorine gas, glass, metals, water and other substances burn with a bright flame. It is far too reactive to be found in elemental form and has such an affinity for most elements, including silicon, that it can neither be prepared nor should be kept in glass vessels. In moist air, it reacts with water to form the equally dangerous hydrofluoric acid. $F_2$ is not a good selection for infusion into hydrocarbon formations.

PROPELLANT SPECIFIC IMPULSE m/s Ideal (I) Field (F) "Field" refers to actual engine firing data.

| Solids: (IUS(3) ≈ 3.0 m/s) | | |
|---|---|---|
| $10CH_2 + 72NH_4ClO_4 + 18Al$ | I = (4) | F = 3.33 |
| $10CH_2 + 52NH_4ClO_4 + 20Al$ | I = (4) | F = 3.40 |
| $14CH_2 + 72NH_4ClO_4 + 14Be$ | I = (4) | F = 3.40 |
| Monopropellants | | |
| $H_2O_2$ (hydrogen peroxide) | I = 2.40 | F = 1.88 |
| $N_2H_4$ (hydrazine) | I = 2.64 | F = 2.59 |
| Bipropellants | | |
| $ClF_5 + N_2H_4$ | I = 3.79 | F = 3.65 |
| $N_2O_4 + N_2H_4$ (5) | I = 3.96 | F = 3.47 |
| $O_2 + RP-1$ (6) | I = 4.52 | F = 3.73 |
| $O_2 + H_2$ (SSME) | I = 4.97 | F = 4.61 |
| $F_2 + N_2H_4$ | I = (4) | F = 4.28 |
| $F_2 + H_2$ | I = 5.18 | F = 4.91 |
| Tripropellants | | |
| $F_2 + H_2 + Li$ (7) | I = 6.89 | F = (4) |
| $O_2 + H_2 + Be$ (7) | I = 6.91 | F = (4) |
| Free Radicals (Unstable) | | |
| $O_3 + H_2$ | I = 5.95 | F = 5.01 |
| $H + H$ | I = 20.89 | F = (4) |
| Nuclear Thermal (≈3500 K) | | |
| $CH_4$ | I = 6.00 | F = (4) |
| $H_2$ | I = 11.00 | F = (4) |

(1) All chemical energy converted to kinetic energy
(2) Modeled for optimum expansion from 6894 kP to 1.379 kP (1000 psia to 0.2 psia, 0.014 atmosphere)
(3) Inertial upper stage—a solid fuel upper stage
(4) No data provided
(5) Ignites on contact. Typical of Titan main engines
(6) Typical of Atlas and Delta main engine
(Reference: Frisbee, Robert, "Ultra High Performance Propulsion for Planetary Spacecraft," JPL D-1184, Pasadena, Calif., 1983)

Processing conditions provide the pressure and temperature necessary to control hydrocarbon-bearing formation penetration of SCFs. Nitrogen in the elemental form was considered to be inert and was even named ozote, which refers to the fact that it is not reactive. Of course nitrogen does form compounds, but the gaseous form consists of diamers $N_2$ (2 nitrogen molecules bonded together). The nitrogen diamer is very stable, and three nitrogen molecules ($N_3$) are also relatively stable.

Nitrogen is a major element in organic compounds. Some nitrogen compounds are highly reactive. Trinitrotoluene is TNT or dynamite. Ammonium nitrate is a fertilizer, but was used as the major explosive ingredient in the Oklahoma City bombing. Anfo, or ammonium nitrate and fuel oil mixture, is the primary explosive used in the mining industry because it is inexpensive, easy to manufacture, and can be easily manufactured near the mine site, thus reducing the risks and expenses related to the transportation of explosives: nitrates, nitrites, and azides (all nitrogen compounds are either oxidizers or reactives and will react violently under the right conditions). There are 221 known nitrogen compounds to select from, depending on hydrocarbon-bearing formation materials and the ability to form a compound in the fuel cell or fuel cell housing. This invention is not limited to nitrogen compounds such as the hydrocarbon-reactive materials. Any compound that is reactive when exposed to hydrocarbons can be injected through the oil or gas bore hole by providing a supply line of compressed gases from above ground and still be within the spirit of this invention. Several bore holes can be provided to supply multiple potential SCFs through each bore hole, or SCFs can be formed from the combination of the violent reactions between non-hydrocarbon materials. It is an objective of this invention to penetrate the full volume of the hydrocarbon formation (e.g. propane migrates to the lowest points in the geologic formation and hydrogen migrates to the highest points in the formation, providing full coverage of potential compressible SCFs). As SCFs penetrate the hydrocarbon formation and migrate out hydrocarbons, many of the natural gases, such as carbon dioxide, nitrogen, hydrogen, propane, and methane, will be compressed into SCFs. The most economic method of SCF formation is supplying a single hydrocarbon reactive compound into the hydrocarbon-bearing formation at a level at which when it contacts hydrocarbon, it will violently react, compressing the natural gases, fluids, and materials into the SCF state, penetrating the hydrocarbons for migration out of the formation.

Non-solid fuels include oil and gas (both fuel types have various varieties). Crude oil consists of a mixture of petroleum liquids and gases (together with associated impurities) pumped out of the ground through oil wells. Oil is a generic term for fluids that are not miscible with water. In the United States, petroleum is referred to predominantly as oil. Petroleum (from Latin petrus, rock, and oleum, oil) or mineral oil is a thick, dark brown or greenish flammable liquid, which, at certain points, exists in the upper strata of Earth's crust. It consists of a complex mixture of various hydrocarbons, largely of the methane series, but may vary much in appearance, composition, and properties. Natural gas, which is about 80% methane, with varying proportions of ethane, propane and butane, is used as a fuel.

Coal is a solid fossil fuel extracted from the ground by mining. It is a readily combustible black or brownish-black rock. It is composed primarily of carbon and hydrocarbons, along with assorted other elements, including sulfur.

All these types of fuel are combustible: they create fire and heat.

A fuel cell is not needed in this invention to practice the art of SCF penetration into hydrocarbon formations. This invention teaches the infusion of hydrocarbon-reactive compounds into hydrocarbon-bearing formations that violently react (micro-bursts of energy) with hydrocarbons compressing gases (supplied from above ground, a fuel cell, or naturally within the formation) into SCF with nearly 100 percent penetration into hydrocarbons for extraction. The potential SCF or as may be natural to the formation and may be any material, including any number of reactants or any number of SCFs combined to migrate hydrocarbons out of the formation. This invention teaches that water may be removed from a geologic formation by selecting for it. This invention teaches that the SCFs can be selected for and combined, if needed, to penetrate the upper or lower regions of the formation. Water adsorbs anhydrous ammonia and can be saturated with anhydrous ammonia (e.g. 25% adsorption), which will react with hydrocarbons when injected into a geologic hydrocarbon formation, forming $sCH_2O$ (supercritical water). $sCH_2O$ has its own unique behavior just prior to going supercritical, because the water dissolves into the formation and is adsorbed, releasing the anhydrous ammonia at the most opportune time. Waste steam from a solid oxide fuel cell can have the anhydrous ammonia added to it as the steam is introduced to the hydrocarbon formation.

Infusion of fuel cell produced nitrogen diamers in hydrocarbon-bearing formations where very stable major-gas nitrogen diamers (2 nitrogen bonded together with traces of 3 nitrogen) do not react with hydrocarbons. When combined with minor-gas nitrogen compounds that are highly reactive (nitrates, nitrites and azides) and with hydrocarbons, they react as a fast, thorough hydrocarbon migration technique to enhance oil recovery in oil fields, completely recovering additional reserves or prolonging production after primary, secondary, and tertiary recovery methods no longer produce oil or gas economically.

SCF increases production efficiency of older fields that can be prolonged by in-situ fuel cell refining of hydrocarbons from within hydrocarbon-bearing formations. The major gas being infused is very stable nitrogen diamers combined with minor gas highly reactive nitrogen compounds: nitrates, nitrites and azides (all nitrogen compounds are either oxidizers or reactives and will react violently under the right conditions). When the minor highly reactive nitrogen compounds (nitrates, nitrites and azides) reach hydrocarbon in formations, even at great distances, a micro-violent reaction occurs, compressing stable nitrogen diamers into an SCF with the rapid dissolution rate required to penetrate hydrocarbon-bearing formations as an SCF solvent. This invention teaches that SCF energy can be injected into hydrocarbon-bearing formations when minor traces of highly reactive nitrogen gas compounds reach hydrocarbons; they react violently, compressing the major gas, nitrogen diamers, into the SCF state of $scN_2$ within hydrocarbon cells (natural geologic hydrocarbon formations within the non-hydrocarbon micro-porosity), forming a large number of nucleation sites (orders of magnitude more hydrocarbon penetration by SCFs than would naturally form from nitrogen diamers migration alone) where controlled cell growth occurs. A large and rapid pressure drop immediately follows SCF states to create the large number of uniform migration sites. Cells are expanded by diffusion of gas into bubbles (phasing out of their SCF energy state) containing both hydrocarbons and stable nitrogen diamers, further migrating hydrocarbons from the hydrocarbon-bearing formation.

A fuel cell generates electricity from continuously supplied streams of fuel and oxidant. The two streams do not mix or burn, but produce electricity by electrochemical reactions similar to a conventional battery. The details of the chemical reactions depend on the type of fuel cell, but in all types an electrically charged ion is transferred through an electrolyte, which physically separates the fuel and oxidant streams. The fuel cell thus provides an elegant means of converting the chemical energy of the fuel directly into electrical energy.

Fuel cell assemblies are inserted down hole into a hydrocarbon-bearing formation, regulated by above ground oxygen air supplies down hole, and only upper lightweight environmentally safe atmospheric air is regulating working gas down hole. Waste gas and steam of the fuel cell are infused into hydrocarbon formations between the bore hole inner diameter wall and the plurality of infinitely variable seals that seal the fuel cell assembly within the bore hole. Coal, tar sands, petroleum-contaminated soil, shale beds, and/or oil wells that have lost gas pressure can also have hydrocarbon recovery by this invention's in-situ method.

Gas-refining in situ is provided by a plurality of bore hole seals separating and migrating the fuel cell gases into hydrocarbon formations. This invention teaches an oil well recovery system to target the release of nitrogen in the lower formations and steam in the upper formations, which result from down hole fuel cells that release steam and nitrogen. This decomposes the formation, increasing the pressure in the formation with a violently reacting propellant fuel relative to hydrocarbons pushing out hydrocarbons and water. This multi-sealed fuel cell heat exchanger and conduit vessel can be inserted down hole within any hydrocarbon-bearing formation: shale bed, oil formation, gas formation, water membrane, coal, contaminated ground, and tar sands, to provide migration of hydrocarbons from hydrocarbon-bearing formations, consuming the decomposed organics as fuel cell fuels.

Changing the lengths of the intake and exhaust tubes, seal locations and manifolding separates the system components, positioning them within hydrocarbon-bearing formation locations, possibly multiple systems applied to multiple formations within one bore hole.

A plurality of down hole gas seals are applied at variable depths to isolate and separate gas in the gradient of gases desorbed from hydrocarbons; the lighter gases are at the top and larger gas molecules are at the bottom of the bore hole. In addition to gas separation, a plurality of down hole gas seals provides a higher gas pressure, which is required at the inlet fuel-port of fuel cells to prevent parasitic energy loss of 4.4 to 7.5 kW/hr's from fuel compressors required in the absence of pressurized fuel. This down hole gas separation with a plurality of seals is gas refining in situ.

By separating the gases between multiple seals down hole, a blend of all the gases can be delivered to the fuel cell at 3 to 5 atmospheres of pressure. Hydrogen is a major component of sour gas, and this invention teaches that fuel cells can consume the majority of hydrogen to make water, electricity, and heat in the range of 1200° F. to 1800° F. needed for further hydrocarbon migration. This invention teaches controlling the gas separation down hole by the placement of a plurality of seals regulated through a manifold that separates gases for blending in the fuel cell, which provides the production of nitrogen diamers and nitrogen compounds. The fuel cell computer control is wired to sensors throughout the fuel cell for programming precise temperatures and pressures for optimized electrochemical reactions. An elevated temperature of 250° F. to 1240° F. fuel cell exhaust temperature is desirable as a source of heated gas passing through the down hole heat exchanger. This invention teaches production of fuel exhaust gases and post-processing fuel cell exhaust gases at a range of 250° F. to 1800° F., moving the gases (e.g. steam and nitrogen) into the porous hydrocarbon-bearing formation gases, liquids, and solids, providing continuous pressure to move hydrocarbons out and infusion of stable nitrogen diamers ($N_2$) combined with traces of hydrocarbon-reactive nitrogen compounds into hydrocarbon-bearing formations.

An ideal location for low-pressure oil recovery is where limestone cap formations exist above the hydrocarbon formations, because in these cases a fuel cell in situ below the limestone and within fluid communication of the hydrocarbon formation can produce water steam pressure and approximately 78% nitrogen waste gas for injection into the formation. Nitrogen diamers infusion into the formation is preferred over steam, because the nitrogen is relatively inert and does not react with the hydrocarbons or the formations that the hydrocarbons are held in. Steam from the fuel cell in contrast can be applied to pressure some formation where the porosity, permeability, and formation materials will tolerate the water and steam pressures. In prior steam injection art, hydrocarbon formations collapse from water-dissolving formations. This invention teaches a down hole fuel cell that converts intake air from above ground and hydrocarbons from within the formation to produce nitrogen and steam that can be infused into the formation, adding pressure in hydrocarbon formations that have porosity and permeability. This allows hydrocarbons to migrate to nearby bore holes in fluid communication with the same formation. Core sample records could determine if the formation can tolerate the addition of steam; nitrogen is always going to be the preferred gas to increase hydrocarbon formation pressure for hydrocarbon migration.

FuelCell Energy, Inc. or Rolls-Royce Fuel Cell systems are more durable and maintainable than the nearest competitors. The Rolls-Royce Fuel Cell is produced by screen printing on low-cost ceramic type materials using proven production processes and minimal exotic materials. Hybrid fuel cells can easily be made by screen printing other chemical compounds onto the ceramics; another electrolyte, a catalyst for producing nitrogen compounds, etc. . . . . Profile, size, and weight make solid oxide fuel cells (SOFCs) suitable for distributed generation with potential for power densities equivalent to gas turbine systems. SOFCs have negligible air emissions (i.e. SOx, NOx, CO, and particulate matter), minimal noise profile, and can be entirely recycled at the end of its useful life. Unique modular SOFC designs can enable field change-out without interruption of supply and enhance support through state-of-the-art diagnostic and prognostic systems. Safety in operation is realized because the Rolls-Royce SOFCs system contains less than ten seconds of fuel supply at any time. Durability, low parts count, and the elimination of low durability components gives a realistic design target of 40,000 hours of operation on a mature product and a 20-year, 160,000-hour overall plant life potential. SOFC systems can be configured to use existing hydrocarbon-based fuels, i.e. natural gas and liquid fuels, and alternative fuels such as coal gas and bio-mass.

Because fluid and gas molecules can move around quickly, temperature differences do not build up in fluids or gases. Convection is the process that distributes the hot gases evenly in a heated hydrocarbon formation. If a mechanical means is used to increase convection, for example, a pump (or compressor) or fan, the process is called forced convection. Forced convection is an option used in this invention to heat the hydrocarbon formation when natural convection no longer yields a gas: a compressor circulates working gases continuously along the fuel cell to carry away excess heat. Conduction processes may occur in the liquids and gases, but for these fluids, it is difficult to prevent motion of parts of the gases and liquids; once molecules are in motion transporting heat, they are converted to circulating convection-working gases and liquid.

If heating moves molecules far enough apart, the critical temperature will be reached, at which point the influence of attractive forces is almost completely overcome. The molecules are no longer constrained. The molecules, now a gas, would be able to move about freely and completely fill the volume available within formation porosity. Gases are characterized by their sensitivity to changes in temperature and pressure. In the kinetic gas theory, gas pressure increases when a gas is enclosed in a fixed volume and its temperature is raised. The gas pressure is the measure of the average speed at which the gas molecules move about. SCFs form when the rate of a gas compression is high enough to saturate neighboring molecules without volume increases (a temporary energy potential stored). When the temperature is raised, the average speed of the particles increases, as does their energy. Nitrogen diamers SCFs strike the hydrocarbon formation walls at higher speed, saturating hydrocarbons with energy potential, and thus exert a larger force between the wall and hydrocarbons, migrating the hydrocarbons at greater distances faster. Reference to hydrocarbon-bearing formations may include any hydrocarbon formation and does not limit this invention to oil and gas recovery.

This invention teaches that convective currents can be added to any hydrocarbon formation by sealing the well hole with a plurality of seals that seal gas pressures down hole during heating, which will increase the pressure and penetration of working gas, "stripping" hydrocarbons from hydrocarbon-bearing formations. In this invention, gas compressors or supply lines can be inserted within the plurality of seals, forcing convection-working gases to cycle back to the heat source within the hydrocarbon formation, increasing distance penetration of working gases. Hydrocarbon-bearing formations have a wide range of pore sizes, which may require forced convection in situ cycled between the pluralities of down hole seals. This invention teaches that holding the gases within a natural or forced convection heat until the heavier organics are decomposed down hole can process all the organics and gases in the hydrocarbon formation, meeting environmental emission requirements. This is in-situ refining.

Fuel cell intake air is vacuumed, blown, or compressed mechanically to move atmospheric air through the fuel cell to deliver oxidants. This invention teaches that heating the working gas from hydrocarbon formations from fuel cell waste heat through a down hole heat exchanger provides all the fuel to produce electricity, steam, and nitrogen. Intake air is vacuumed against the oxygen adsorption site of a fuel cell, providing oxygen to the fuel cell. A very simple down hole in-situ fuel cell system would require an air blower or compressor at a parasitic loss because it would have to mechanically move atmospheric air through the fuel cell to deliver oxygen from air. The down hole heat exchanger on the fuel cell housing provides heat to decompose hydrocarbons for fuel gases, depending on the fuel cell type. Solid oxide is the preferred fuel cell type because it can react with a family of hydrocarbon sourced gases—a hybrid combination of different types of fuel cells can be applied to refine decomposed hydrocarbons. This invention teaches that an optional manifolding system and adsorbents species can be applied and customized to process difference ratios of organic species available across an infinitely variable range of formations. Any number of these heat exchanger bore hole sealed systems can be applied in the same bore hole, which is governed by the thickness and number of formations. Steam can be applied to damage and collapse an upper formation to increase the sealing of the lower formation. Collapsing formations, whether below, above, or around the bore hole, is a professional judgment of the geologist managing the hydrocarbon production. An air supply, fuel cell, and sealed heat exchanger plumbed with conduit to infuse nitrogen into the formation and release steam to atmosphere or infusion into a formation are all that is needed to make the system work.

The oxygen required for a fuel cell comes from air mechanically moved to the fuel cell. A reformer turns hydrocarbon or alcohol fuels into hydrogen, which is then fed to the fuel cell. Unfortunately, reformers are not perfect. They generate heat and produce other gases besides hydrogen. They use various devices to try to clean up the hydrogen, but even so, the hydrogen that comes out of them is not pure, and this lowers the efficiency of the fuel cell. Methanol is a liquid fuel that has properties to gasoline. It is just as easy to transport and distribute, so methanol may be a likely candidate to power fuel cells.

Five major types of fuel cells exist, and each has a different operating temperature, as follows: Fuel cells such as polymer electrolyte membrane fuel cells, 75° C. (180° F.); alkaline fuel cells, below 80° C.-75° C. (180° F.); phosphoric acid fuel cells, 210° C. (400° F.); molten carbonate fuel cells (MCFC) 650° C. (1200° F.); SOFCs, 800° C.-1000° C. (1500° F.-1800° F.). MCFCs and SOFCs have operating temperatures high enough to desorb and strip hydrocarbon bearing formations at 1200° F. to 1800° F.

MCFC uses a carbonate-salt-impregnated ceramic matrix as an electrolyte. Because MCFCs operate at 800° F., they are best suited to large, stationary applications. Yet they potentially have the most to gain, as they operate at 85 percent efficiency with cogeneration. They will be especially useful in hospitals, hotels, or other industrial applications that require electricity and heating (or cooling) around the clock.

SOFCs are best suited for large-scale stationary power generators that could provide electricity for factories or towns. SOFCs use a prefabricated ceramic sandwich between electrodes. Like MCFCs, they operate at higher temperatures (about 1000° F.) and make excellent co-generation devices for industrial applications where high temperature steam is required.

www.eere.energy.gov/hydrogenandfuelcells/fuelcells/types.html

One of the characteristics of an SOFC is that the fuel must be injected into the cell chamber at relatively high pressure of three to five atmospheres. When using gaseous fuels, this requirement for fuel compression requires significant power, which must be considered part of the system when calculating net power output. The fuel compressor is a parasitic load reducing fuel efficiency. Two examples: a Capstone® Turbine C30 generates 30 kW/hr and would require a minimum of 4.4 kW/hr fuel compressor, compared to model CapStone® Turbine C60, which generates 60 kW/hr and would require up to a 7.5 kW/hr fuel compressor.

Synthetic molecular sieves are porous, crystalline alumino-silicates that function much like a natural sieve; they adsorb some molecules and reject others. The absorption and desorption are completely reversible. Custom synthetic molecular sieves are applied in above ground modem oil refineries as molecular gas separator beds. In contrast, hydrocarbon-bearing formations are a natural composite of several natural molecular sieve species, which in a past natural environment have adsorbed a variety of organic hydrocarbons. In addition, the organic molecules physically imbedded in the natural hydrocarbon-bearing sieves have adsorbed gas molecules (e.g. hydrogen, methane, carbon dioxide). The molecular variety of organics in hydrocarbon-bearing formations is related directly to several natural molecular sieve species. Since molecular sieves adsorb materials through physical forces rather than through chemical reaction, they retain their original chemical state when the adsorbed molecular is desorbed. There are five types of adsorption/desorption cycles:

1. Thermal swing cycles involving rising desorption temperatures,
2. Pressure or vacuum swing cycles involving decreased desorption pressures,
3. Purge-gas stripping cycles using a non-adsorbed purge gas,
4. Displacement cycles using an adsorbable purge to displace the adsorbed material, and
5. Adsorptive heat recovery, using the retained heat of absorption to desorb certain molecules (e.g., water).

This invention teaches applying all five of the above-mentioned adsorption/desorption cycles to produce nitrogen compounds that react violently with hydrocarbons.

Yet a further drawback of the prior art is that the working gas required to recover hydrocarbons was not a combined non-reactive and reactive nitrogen compound. Stationary hydrocarbon-bearing formation requires working gas penetration radially from the bore hole into the depth of a hydrocarbon-bearing formation rather than the limits of conductive and radiant heat limited to the immediate proximity of the heat source. Hydrogen is released from the hydrocarbon-bearing formation when heated. This invention teaches methods of pressuring the hydrogen into the porous hydrocarbon-bearing formation, penetrating the hydrocarbon-bearing bed with a hot working gas at greater distances and variable pressures.

The alternative recovery process involves in-situ operations wherein bore holes drilled into subterranean hydrocarbon formations vertically, horizontally, and at angles are combined with various apparatus intended to recover oil and/or gas from the surrounding hydrocarbon-bearing formations.

To be considered economically feasible, a recovery system must be capable of functioning when applied to hydrocarbon-bearing formations located at any depth, even at the most minimum of depths such as when the overburden may extend only five feet in depth, thereby avoiding the necessity of drilling bore holes of extreme depths. Additionally, a viable system should integrate cogeneration systems that manage heat and should, once in place and operational, be capable of producing commercially acceptable electricity and water from the gas for an extended period of time.

In accordance with the present invention, the working fluid can be heated. Thermal chemical reaction will not occur, and catalytic reaction will be easier to manage, since the working gas physically moves from one location to the other by pressure and heat. Further, in some embodiments the working gas contains multiple gases: hydrogen, helium, propane, methane, and carbon dioxide.

Propane gas is affected by gravity, moving downward, and can be released into the drill hole to penetrate the hydrocarbon pores, providing a catalyst that can be added to start a chemical reaction within the bore hole and then substantially removed. Some catalytic reactions need an even distribution of catalyst, and this technology can provide an aggregate effect, gathering density, or a uniform effect. Prior art does not teach uniform gradient or thermal processing or reactive gas that compresses working gases into SCFs that saturate and then migrate hydrocarbons at any distance.

DESCRIPTION OF THE RELATED ART

Prior enhanced oil recovery projects may involve gas re-injection, carbon dioxide ($CO_2$) flooding, or various horizontal drilling techniques.

Prior art has three stages of oil field development: primary recovery, secondary recovery, and tertiary recovery. Primary recovery produces oil and gas using the natural pressure of the reservoir as the driving force to push the material to the surface. Wells are often stimulated through the injection of fluids, which fracture the hydrocarbon-bearing formation to improve the flow of oil and gas from the reservoir to the wellhead. Other techniques, such as pumping and gas lift, help production when the reservoir pressure dissipates. Secondary recovery uses other mechanisms—such as gas reinjection and water flooding—to produce residual oil and gas remaining after the primary recovery phase. Tertiary recovery involves injecting other gases (such as carbon dioxide) or heat (steam or hot water) to stimulate oil and gas flow, producing remaining fluids that were not extracted during primary or secondary recovery phases.

SCF recovery methodology eliminates the prior art's three stages: primary, secondary, and tertiary. SCF methods are intended for brand new bore holes (and pressure depleted formations) in hydrocarbon formations where SCFs and heat from fuel cells can substantially refine petroleum, produce clean natural gas in situ, apply heat to break methane into hydrogen, and completely migrate hydrocarbons in situ in a single process.

SUMMARY OF THE INVENTION

The process presented herein produces gases and fluids that are separated down hole and regulated to decompose the maximum amount of the organics in hydrocarbon formations by convection working gases that migrate reactive gases into contact with hydrocarbons, compressing surrounding gases into SCFs.

The process presented herein produces gases and fluids that are separated down hole by a fuel cell and regulated to decompose the maximum amount of the organics in a depleted oil well bore hole by moving air into the fuel cell as it heats and decomposes convection working gases, providing steam and nitrogen to pressure fluids out of the oil formation.

Accordingly, one of the objects of the present invention is to provide an improved process for desorbing the gasification of oil in situ, including the controlled application of heat within a bore hole from a fuel cell to increase steam pressure and provide nitrogen as a working gas to pressure formations filled with oil. Some formations will require steam to press the oil out of the formation, and other formations will be damaged from the steam. This invention teaches that the nitrogen, steam, and other exhaust gases from the fuel cell can be applied to increase pressure in the formations by infusion directly into the formation from the fuel cell. Fuel cells can infuse nitrogen alone into formations that are damaged or would be damaged by steam injection methods. Other residue gases decomposed from heat absorption radially around the fuel cell housing will be applied as fuel cell fuel or reinjected into the formation as working fluid when the gas available matches the formation survivability.

With these and other objects in view that will more readily appear as the nature of the invention is better understood, the invention consists in the novel process and construction, combination and arrangement of parts hereinafter more fully illustrated, described and claimed, with reference being made to the accompanying drawings in which:

BRIEF DESCRIPTION OF THE DRAWINGS

FIG. 4 is a table of fuel cell types, fuels, temperatures, electrolytes;

DESCRIPTION OF THE PREFERRED EMBODIMENT

Figure 1:
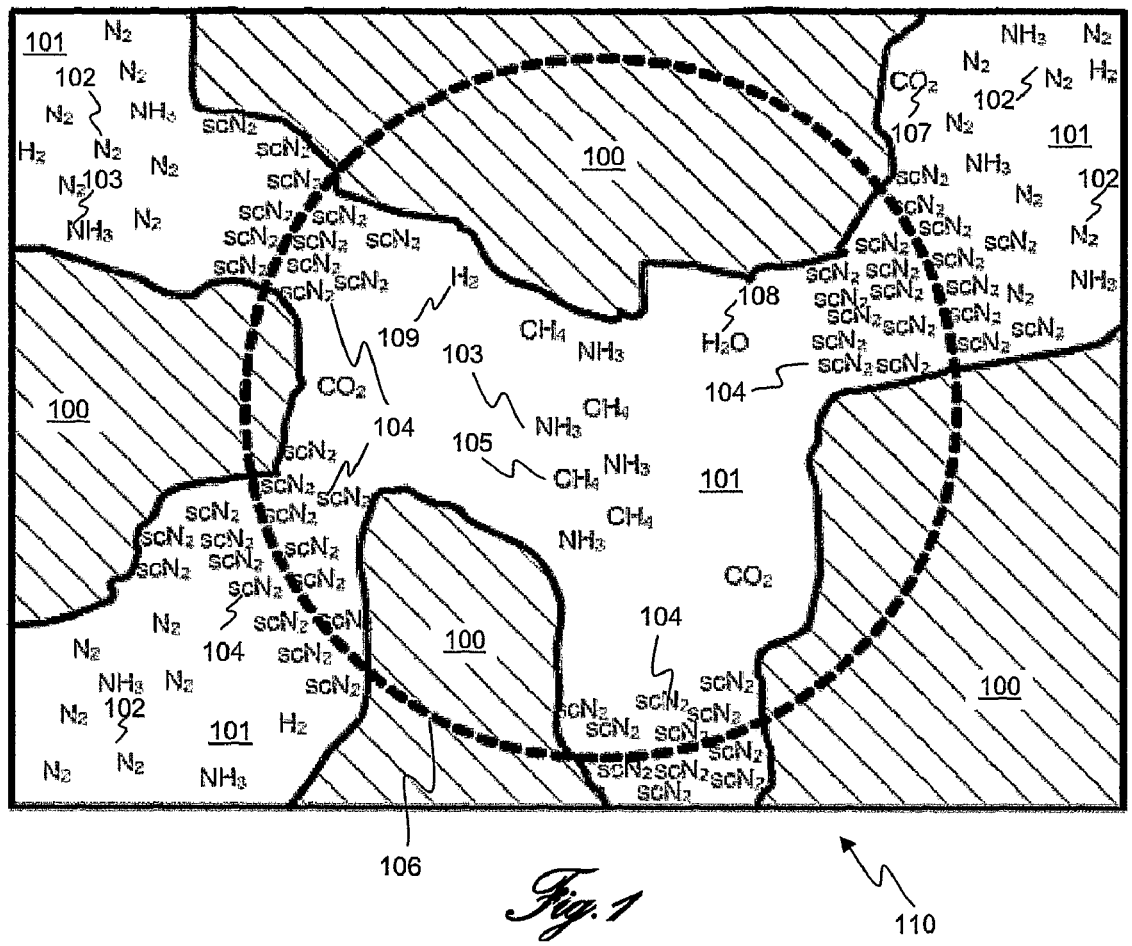
FIG. 1 is a diagrammatic view of an SCF cell in a hydrocarbon-bearing formation.

Referring now to the drawings, particularly FIG. 1, the present invention relates to an in-situ system for recovering hydrocarbons from hydrocarbon formations. In hydrocarbon-bearing formations in FIG. 1, there are two dominant structures: hydrocarbons 100 and the porous non-hydrocarbon formation 101 that structurally form the support of the hydrocarbon-bearing formation 110. Infusion of stable nitrogen diamers ($N_2$) 102 combined with traces of hydrocarbon-reactive nitrogen compounds and anhydrous ammonia ($NH_3$) 103 into hydrocarbon-bearing formations 110, which violently react (micro-bursts of energy) with hydrocarbons methane ($CH_4$) 105, compress nitrogen into SCF cells 106 of supercritical nitrogen diamers ($scN_2$) 104 with orders of magnitude more penetration into hydrocarbons than would naturally form from nitrogen diamers 102 migration alone. Hydrocarbons can be fully saturated with SCF, which migrate hydrocarbons out of formations, even at great distances from the regulated fuel cell source. When potential supercritical gases and fluids are already naturally in situ, carbon dioxide ($CO_2$), 107, water ($H_2O$), 108, ($H_2$) 109 within the formation 100, only a hydrocarbon-reactive compound anhydrous ammonia ($NH_3$) 103 needs to be infused into the hydrocarbon formation 110.

Systems are integrated together into a more efficient cogeneration process: in-situ shale fuel production, electric generation, mechanical turbine energy (electromagnetic generator), and water making. A heat exchanger is designed with three functions: a recuperator/fuel heater, intake air heater, and downhole shale working gas heater. This heat exchanger is connected to the hot gas side of a microturbine and inserted into an organic rich shale borehole to heat working gases in the shale. Inverse rotation water is potable and equal to rain quality.

Heat and fuel path: Hot natural gas desorbed from shale at ~3 to ~6 atmospheres of pressure passes through a recuperator/fuel-heater to a Fuel Cell Energy® fuel cell, while air is simultaneously, filtered, compressed through the Capstone turbine, inverse rotated for water making, heated in a recuperator, and compressed into the fuel cell. Solid Oxide fuel cell (SOFC) generators provide 1500-1800° F. steam to drive the hot-gas turbine blade, which compresses atmospheric air into the fuel cell at the opposite end of the turbine. All or part of the hybrid system can be inserted downhole. Fuel cell water is industrial or farm irrigation quality.

Figure 2:
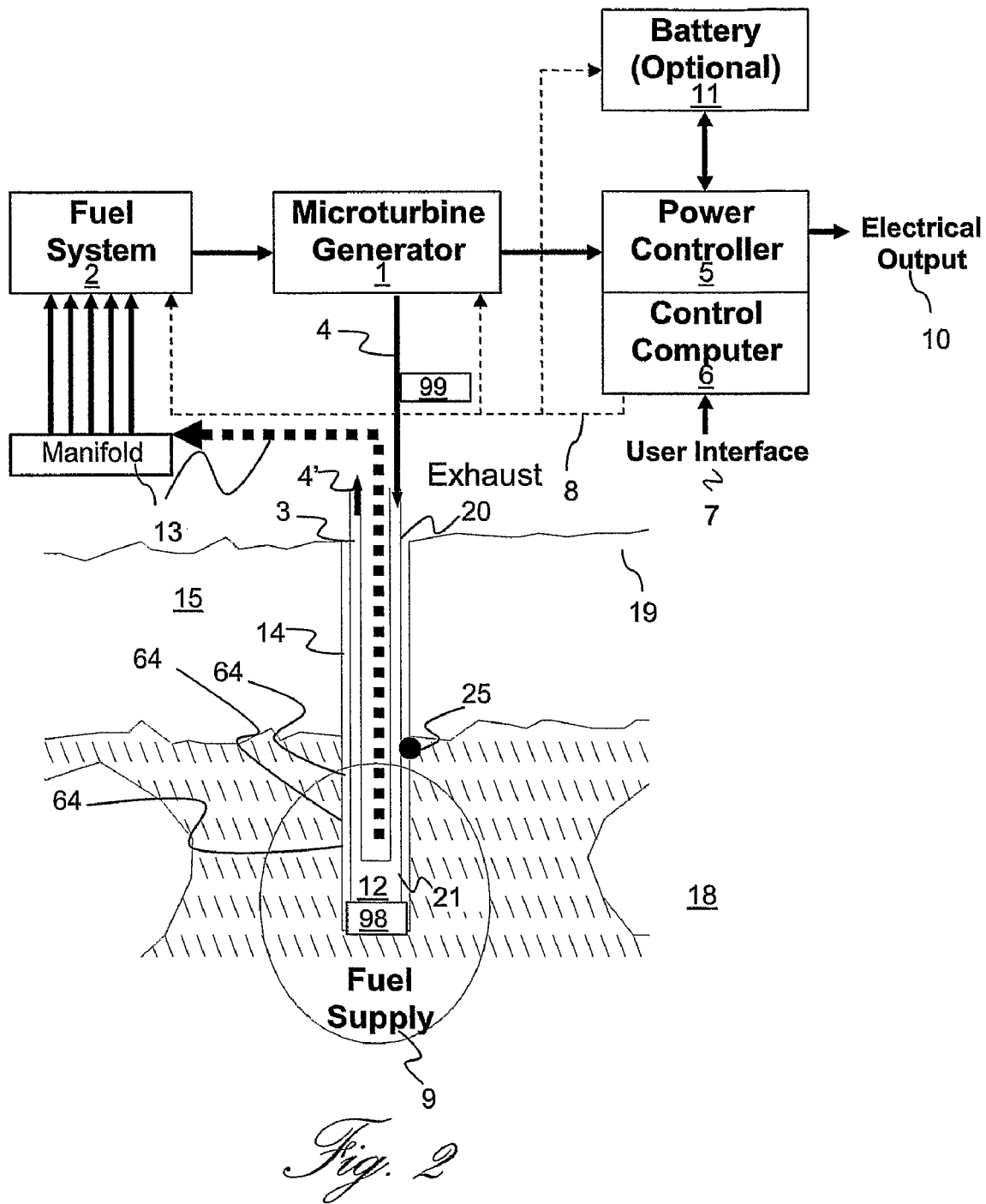
FIG. 2 is a vertical elevation, partly in section, and aboveground systems partly in diagram of an oil hydrocarbon-bearing formation of the present invention.

In FIG. 2 is a heat exchanger assembly, generally designated 12, which is lowered into a bore hole 14 drilled into a hydrocarbon-bearing formation 15 located beneath overburden 16. Exhaust 4 is connected to the heat exchanger 12 in the hydrocarbon-bearing formation 15 and exhaust 4 is an exhaust out of the bore hole heat exchanger 12 vented to air. Exhaust 4 out of the bore hole 14 can be restricted to increase or decrease the temperature of the heat exchanger 12 and the velocity and regulation of air movement out of the heat exchanger 12 can form an adiabatic gas stream into the heat exchanger 4, which minimizes the contact the gases have with the conduit 20 inside diameter before entering the inlet port 21 of the heat exchanger 12. This adiabatic control is important because of the potential depth of the bore hole 14. This invention teaches adiabatic gases can travel greater distances before losing heat to the conduit connected to the inlet port of the heat exchanger 12.

In FIG. 2, intake air is vacuumed against the oxygen adsorption site of a fuel cell in heat exchanger 12 within bore hole 14, providing oxygen to the fuel cell 98. A very simple down hole in-situ fuel cell system would require an air blower or compressor 99 at a parasitic loss because it would have to mechanically move atmospheric air through the fuel cell 98 to deliver oxygen from air. The down hole heat exchanger 12 on the fuel cell heat exchanger housing 12 provides heat to decompose hydrocarbons for fuel gases depending on the fuel cell type. Solid oxide is the preferred fuel cell type because it can react with a family of hydrocarbon sourced gases—a hybrid combination of different types of fuel cells can be applied to refine decomposed hydrocarbons. This invention teaches an optional manifolding system and adsorbents species can be applied and customized to process different ratios of organic species available across an infinitely variable range of formations. Any number of these heat exchanger bore hole sealed systems can be applied in the same bore hole, which is governed by the thickness and number of formations. Steam can be applied to damage and collapse an upper formation to increase the sealing of the lower formation. Collapsing formations, whether below, above, or around the bore hole, is a professional judgment of the geologist managing the hydrocarbon production. An air supply, fuel cell, and sealed heat exchanger plumbed with conduit to inject nitrogen into the formation and release steam to atmosphere or inject into a formation are all that are needed to make the system work. Any natural geologic hydrocarbon formations that have porosity and permeability, which allow hydrocarbons to migrate, are target locations for this invention. An ideal location for low-pressure oil recovery is where limestone cap formations lie above the hydrocarbon formations, because in these cases a fuel cell in situ below the limestone and within fluid communication of the hydrocarbon formation can produce water steam pressure and 78% nitrogen waste gas for injection into the formation. Nitrogen injection into the formation is preferred over steam, because the nitrogen is relatively inert and does not react with the hydrocarbons or the formations that the hydrocarbons are held in. Steam from the fuel cell in contrast can be applied to pressure some formations in which the porosity, permeability, and formation materials will tolerate the water and steam pressures. In prior steam injection art, hydrocarbon-bearing formations collapse from water dissolving the formations' non-hydrocarbon porous structures. This invention teaches a down hole fuel cell that converts intake air from above ground and hydrocarbons from within the formation to produce nitrogen and steam that can be injected into the formation, adding pressure in hydrocarbon formations that have porosity and permeability, which allow hydrocarbons to migrate to nearby bore holes in fluid communication with the same formation. Core sample records could determine if the formation can tolerate the addition of steam where nitrogen is always going to be the preferred gas to increase hydrocarbon formation pressure for hydrocarbon migration. In some formations, there are multiple layers of hydrocarbon formations, perhaps above and below a limestone layer, which could have the steam applied to the upper layer and nitrogen applied to the lower layer from the same fuel cell source or fuel cells adjacent to the formation. As the depth of the formation increases, the conduit and tubing can be cobalt stainless steel with insulation of the Esterline silicone insulating surface types, which includes making the seals out of silicon types for heat survivability and petroleum resistance.

Pressurized air needed by the SOFC can be provided by the compressor, the SOFC can act as the system combustor, and the exhaust from the SOFC can drive the compressor and a separate generator. The fluid stream contains gases and/or liquids. Siemens Power and Franklin Fuel Cell are leading the industry in SOFC fuel cells. For the purposes of this invention, the Rolls-Royce fuel cell was selected for its innovative use of ceramics to connect the circuit, with greater lifetimes anticipated. Tube fuel cells will fit down hole in this invention's heat exchanger in FIGS. 5-12. The convection gases would be consumed by the tubular array fuel cell with the Franklin, Rolls-Royce, Siemens, FuelCell Energy, Inc., or other suitable fuel cell. In FIG. 4 table, the six basic different types of fuel cells are listed to evaluate and match fuels to thermal requirements in situ to target hydrocarbon formations. A further objective of this invention is to separate the gases and select the best gas for each fuel cell type until most of the desorbed hydrocarbon-bearing gases are consumed by a fuel cells matched to the gas types (e.g. hydrogen, methane, carbon dioxide, and carbon monoxide). Adjustments can be made in the fuel cells to supply the ratio of gases best for hydrocarbon gas infusion and in-situ refining technology. During normal operation, air enters the compressor and is compressed to ~3 atmospheres. This compressed air passes through the fuel cell, where it is preheated, and then enters the SOFC. Pressurized fuel from the fuel pump also enters the SOFC and the electrochemical reactions takes place along the cells. The hot pressurized exhaust divides the SOFC into three streams: steam, nitrogen diamers, and nitrogen compounds, which migrate to hydrocarbon formations. Electric power is generated by the SOFC (dc), which is the most efficient use of this system.

Fuel supply 9 has to be pressurized between ~3 to ~5 atmospheres. A fuel compressor is required if gas is low pressure.

As shown most clearly in FIGS. 5-11, the cylindrical 30 of the heat exchanger assembly 12 defines an enclosed interior 41 bounded by a top wall 42 and bottom wall 43. The purpose of the heat exchanger 12 is to deliver a substantially constant amount of the heat to the surrounding gases and liquids decomposing hydrocarbon from formation 18; a close fit exists between the periphery of the heat exchanger housing 44 and the wall 46 of the bore hole. As an example, the heater housing may be ten inches in diameter and disposed within a 12-inch bore hole, thereby insuring a definite but minimal lateral clearance between. Special heat resistant stainless alloys coated with Esterline silicon insulation, carbon foams developed by Oak Ridge National Labs, coal-based foam (www.CFoam.com Super Carbon Foam®), high-temperature ceramics, and carbon graphites in refining quenching towers are used for the construction of the heater assembly 12. These materials have been found to satisfactorily withstand exposure to temperatures of 2500° F. for an extended period. The seal and conduit can be coated with insulation materials from Esterline Corporation in Kirkland, Wash., USA to manage the thermal processes in situ. The same technology applied in the hydrocarbon-bearing formation can be applied any depth and separated at any depth for in-situ pressure from fuel cell nitrogen and/or steam. Any of the surfaces of heater assembly 12 can be fuel cell components, because simple screen printing is applied to make SOFCs. The fuel cell heater assembly 12 is an integrated refinery in situ, which combines the refining components of adsorbent molsieves, catalysts, and fuel cell components.

In FIGS. 2, 5-12, conduits communicate between the ground surface 19 and the interior 41 of the heat exchanger 12 housing 47 and include six fuel-gas supply conduit 50 terminating in a suitable gas manifold above ground 13 (FIG. 2), heat exchanger manifold 49 juxtaposed the housing bottom wall 41, conduit 57, and six plugs 58. To separate the gases down hole, the working gas is fuel, a plurality of portholes 51-56 is placed every 60 degrees around the centerline of rotating conduits 50. Conduit housing 57 has one of the six different holes 51-56, providing an intake for hydrocarbon-bearing working gas (fuel) generally separated by gravity gradient. These conduits 50 rotate within the housing 57 to receive different gases for blending in fuel cells or other uses above ground or in the bore hole. For example: intake port 51 would register with the single port in housing 57 port 51, providing only hydrogen gas in that conduit; in contrast, bottom port 56 and inlet port 56 on conduit 50 register to provide the intake of natural propane or carbon dioxide. Exhaust air vents through six annular vents 60. Vents 60 are diagrammed in FIG. 2 as exhaust 4 through conduit 3. Fuel cell hot exhaust gas 4 is provided an insulated conduit 20 (FIG. 2), which is in fluid connection to conduit 45 in heat exchanger 12. All six conduits 50 lead from a heat exchanger assembly 12 up to manifold 13 (FIG. 2), providing the potential to blend fuels in the fuel system (FIG. 2), which distributes fuel to a fuel cell only. A group of fuel cells each consuming the gas as its catalyst and electrolytes are designed to adsorb into a fuel conversion to electricity (this is a refining process with groups of fuel cells each consuming what would otherwise be a waste gas), and other distribution or power systems. For maximum gas separation monitoring, a sensor 25 (FIG. 2) is placed just below the hydrocarbon-bearing formations 18 to monitor gas-leaking from the process. Hydrogen will leak out and this sensor 25 provides the rate to minimize, if not eliminate, the loss of fuels. On conduit 3 (FIG. 2), a butterfly valve 16 is provided to control the exact temperature of the heat exchanger 12; valve 16 provides the exhaust gas stream maintaining it in an adiabatic state by controlling the rate of gas pull through conduit 3 and minimizing the heat loss in the exhaust gas 4 from turbine or other heat sources. Intake conduit 45, housing 57, tube 61, heat exchanger end cap 47 are positioned concentrically within the hydrocarbon-bearing formation 18 bore hole 14 relationship by a suitable plurality of gas seals (not shown) that are infinity adjustable to seal gas clearances between tube 61 and hydrocarbon-bearing formation 18 bore hole 14. The fuel cell circuit will be described hereinafter, following a description of the process of the invention.

In FIGS. 2 and 5-12, continued maintenance of a working gas temperature in the range of 150° C. to 1371° C. and gas pressure at 3 to 7 atmospheres progressively expands the radius of this fuel supply 9 with the mass of volume of the working desorption gas constantly increasing in an amount proportionate to the increase in the radius of the reaction zone. It is projected that as long as the pressure of the convection heated working gases does not leak out of a natural fracture in the hydrocarbon-bearing formation 18 or break through the top of the hydrocarbon-bearing formation 18 (FIG. 2), there is no known limit. This invention teaches that horizontal bore holes can be desorbed by sealing in the heat exchanger with the plurality of seals on the outer diameter of heat exchanger 12 assembly, which includes tube 61 and housing 47 to seal the gas in. It is understood that the heat exchanger can be made any dimension, length, and diameter to desorb very thick hydrocarbon-bearing formations and very thin surface formation. This plurality of seals (not shown) is also used to close off underwater streams where fractures exist. Seal can be manufactured from simple expansion fluid-filled bladders wrapped around housing 47 and tube 61 to seal off bore hole 14, electrically contracted piezoelectric wafer filled expansion tubes/seals, and bipropellant foams. This invention teaches a range of temperatures that match the hydrocarbon-bearing formation organics potential to desorb.

In FIGS. 2, 5-12, as the gas moves through the hydrocarbon-bearing formation, it ultimately reaches the outer tube 61 and passes into one of the six inlet ports 51-56 on rotating conduit 50, the gas space 62 as defined by the thin, cylindrical space intermediate to the heat exchanger 12 surface 44 and bore hole wall 14. The vertical limits of this gas space are restricted to the height of the heater assembly by the inclusion of a plurality of horizontal seal members 64 (FIG. 2), spanning the expanse of the bore hole 14 immediately atop the heat exchanger top wall 63. These air impervious seals, coupled with the bore hole floor 17, are seen from FIG. 2 to restrict all gas directed from the reaction zone into the gas space 62 surrounding the heat exchanger assembly at the external periphery 65. Convection working gas volumes in the desorbed hydrocarbon-bearing fuel supply 9 will be added to by the heat and pressure regulation over time. Convection heated working gas and fluids will form a gradient from gravity in the porous hydrocarbon-bearing formation 9 and the space 62 around the heat exchanger housing. Hydrogen is more abundant in hydrocarbon-bearing formations than prior art tested for. The hydrogen is the smallest molecule to seal into space 62 and will be the top gas inlet port 51 lets pass in. The rotating conduits 50 can be turned to register the inlet ports 51-56 to the ports 51-56 in housing 57. Conduits 50 can be rotated from above ground on the manifold regulating gases. Pressure and the mix of gases in fuel supply 9 are controlled to decompose the crosslinked organics to their lowest molecular weight material. Conduits 50 are heated by annular vent 60 and turbine exhaust gas intake tube 45 to keep the fuel supply and separation conduits 50, 57 clean. Exhaust gas 4 can have heat added by burning some fuel 9 above ground if a cogeneration element of the aboveground hybrid heat source is not at a high enough temperature. Water jet cutting in the bore hole 14 can expand the space 62 to any size required, and the plurality of seals can be any size and shape to accommodate the shape and size of the cavity cut in a greater radius than the bore hole. Water-jets can also precut 5- to 10-centimeter diameter small bore holes (not shown) around the larger bore hole 14 if added convection working gas can make a hydrocarbon-bearing formation more productive or venting a pocket of lightweight gas has formed at a radial distance too great for release out of port 51-56.

Figure 3:
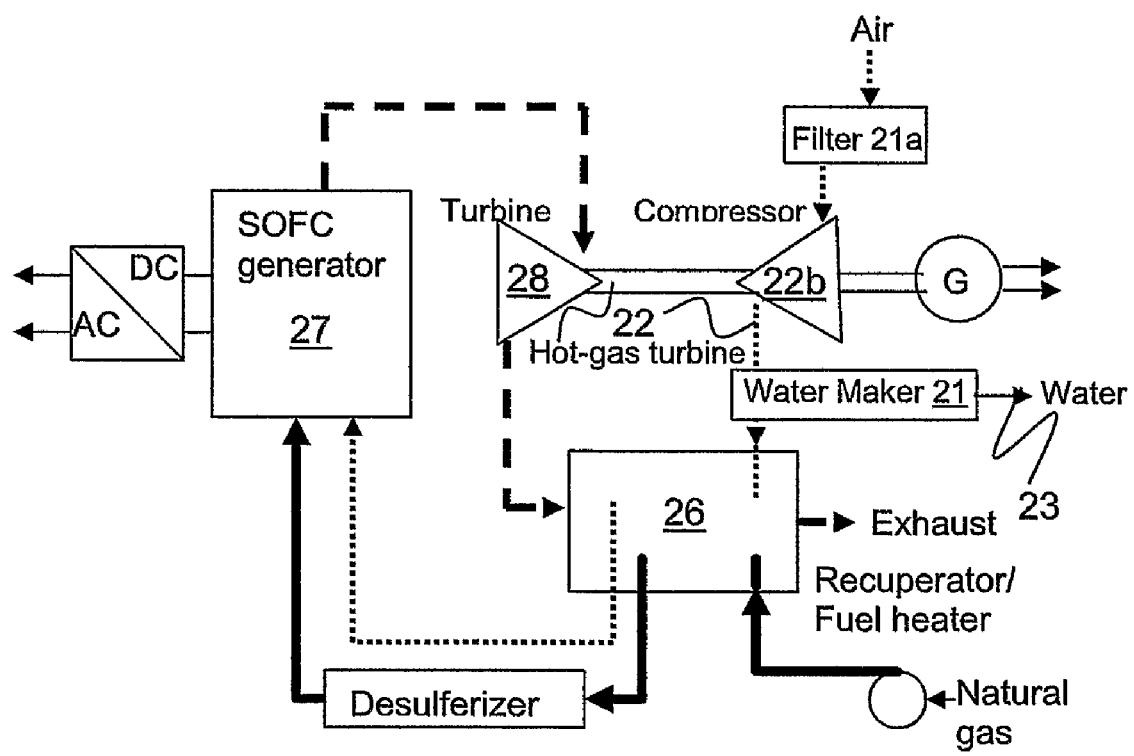
FIG. 3 is a diagrammatic schematic view of an SOFC fuel cell diagram.
Figure 5:
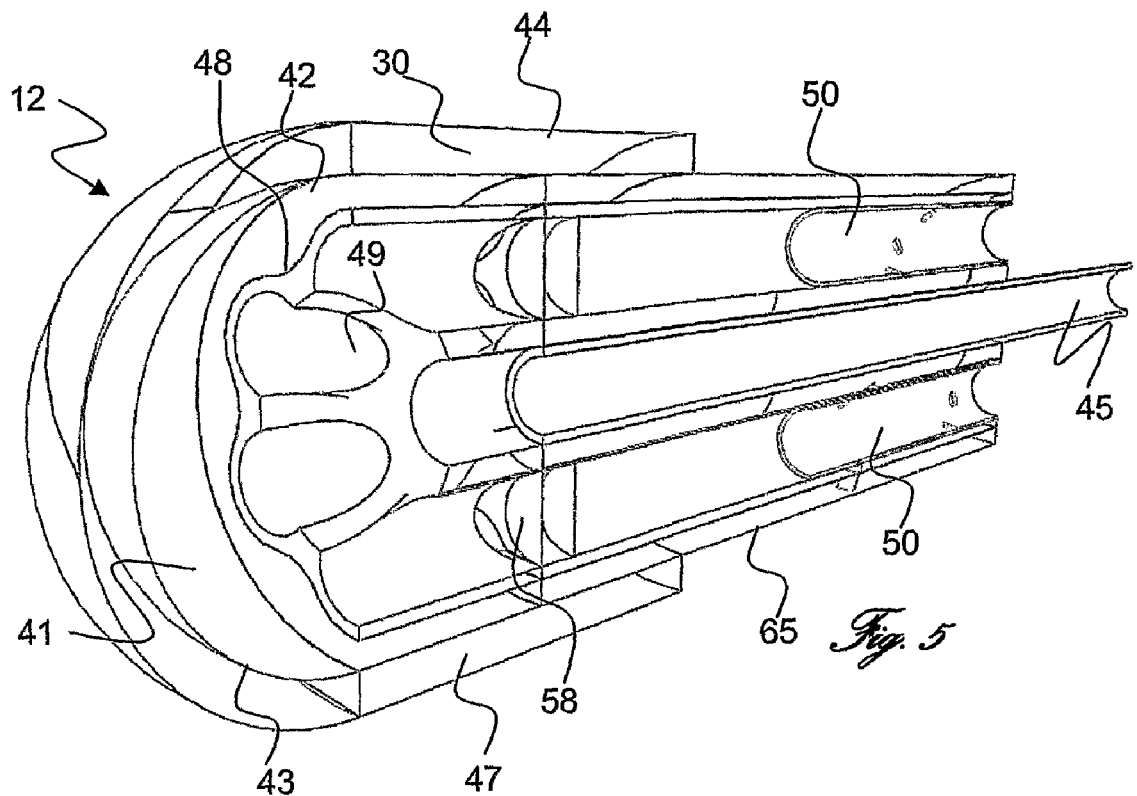
FIG. 5 is a cross-sectional elevated bottom view of a heat exchanger for insertion in a hydrocarbon-bearing formation bore hole.
Figure 6:
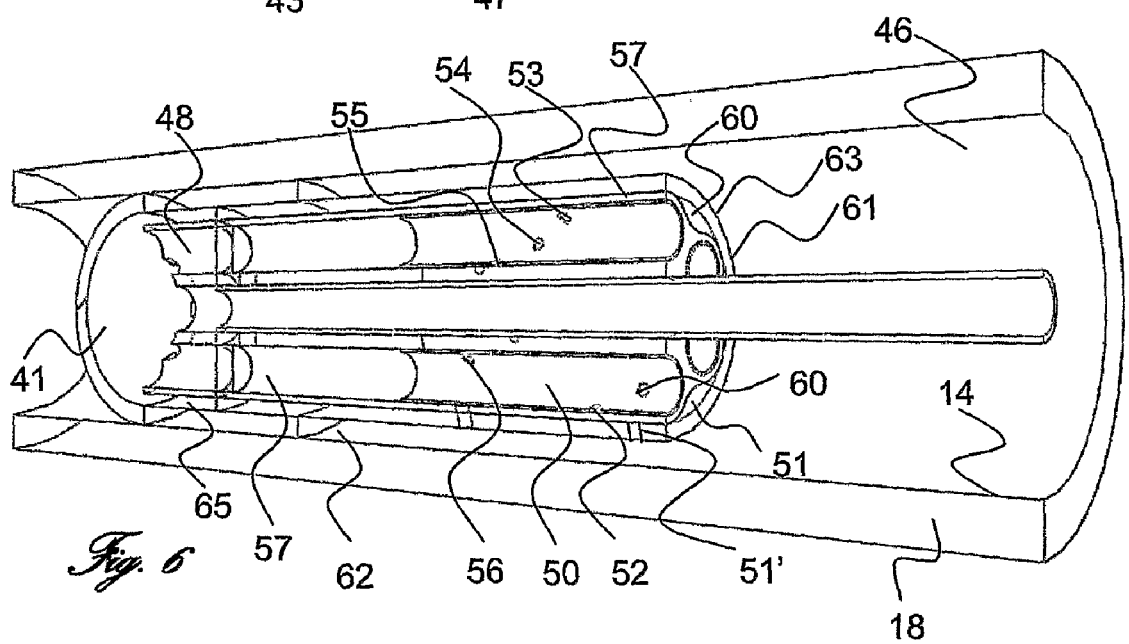
FIG. 6 is a cross-sectional elevated top view of a heat exchanger for insertion in a hydrocarbon-bearing formation bore hole.
Figure 7:
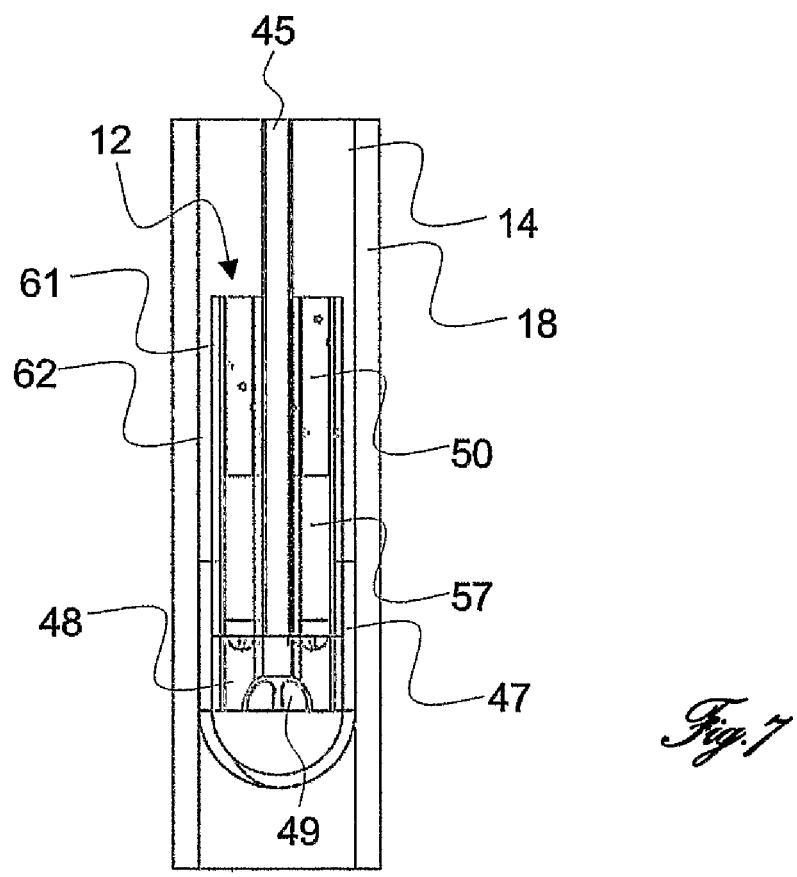
FIG. 7 is a cross-sectional side view of a heat exchanger for insertion in a hydrocarbon-bearing formation bore hole.
Figure 8:
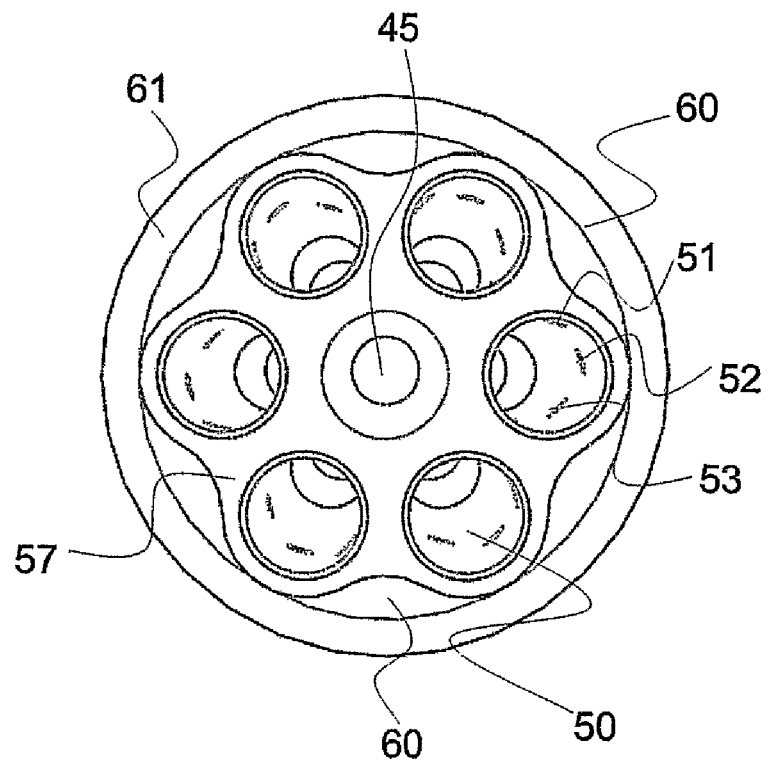
FIG. 8 is an end sectional view of a heat exchanger for insertion in a shale formation bore hole.
Figure 9:
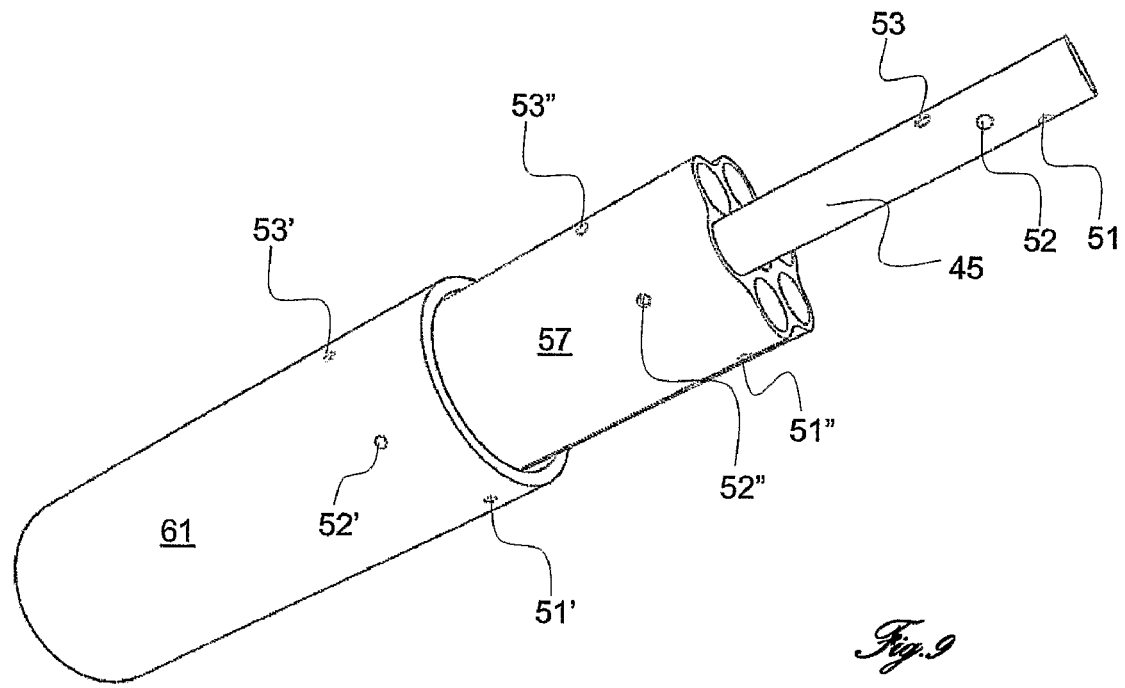
FIG. 9 is a partially exploded view of a heat exchanger bore hole.
Figures 10, 11:
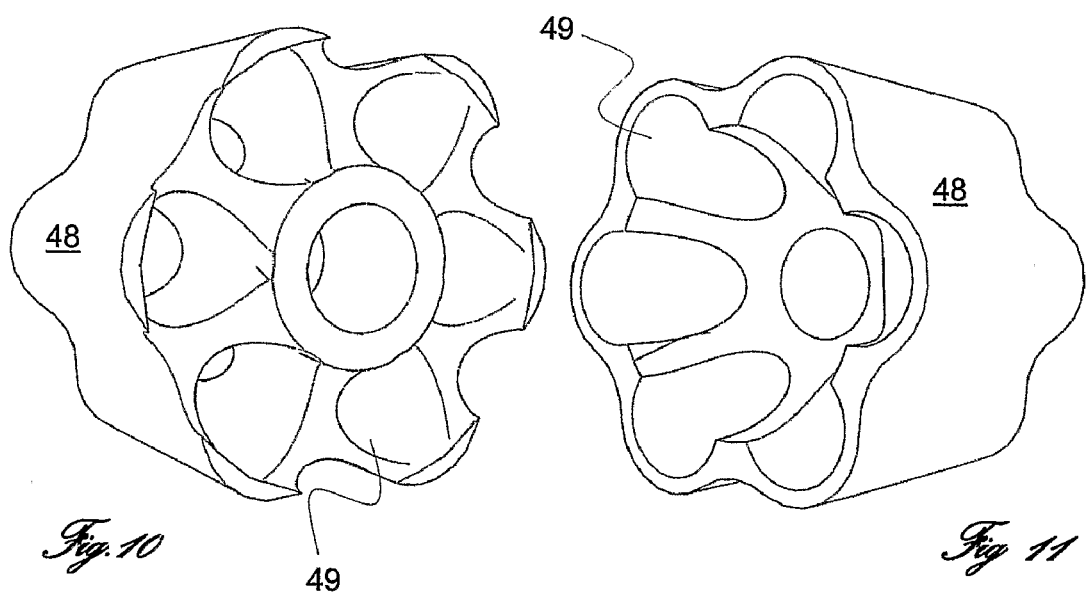
FIG. 10 is an elevated top end view of a heat exchanger core for insertion in the heat exchanger of FIGS. 5-7.
FIG. 11 is an elevated bottom end view of a heat exchanger core for insertion in the heat exchanger of FIGS. 5-7.

In FIG. 3 water production during cogeneration is an additional cogeneration function. Water making from microturbine compressed air inverse rotation is provided by vacuuming intake air through a microturbine air filter 21a; passing the filtered air through a turbine blade 22b; and then compressing the atmospheric air through an inverse rotation water separator 21 before entering the fuel air mixing chamber 26. 99.9% of the water is separated from air and drains out line 23. At the high end, 600-CFM to 900-CFM (Cubic Feet per Minute) of air is compressed through the water separator 21 eliminating parasitic losses (100% loss) that would result from a compressor "exclusively" being used to compress air for the same inverse rotation water separator 21 for water production. Fuel cells 27 consume hydrogen from the shale and a portion of the oxygen from the microturbine 28 intake air 29 providing water and electricity.

Figure 12:
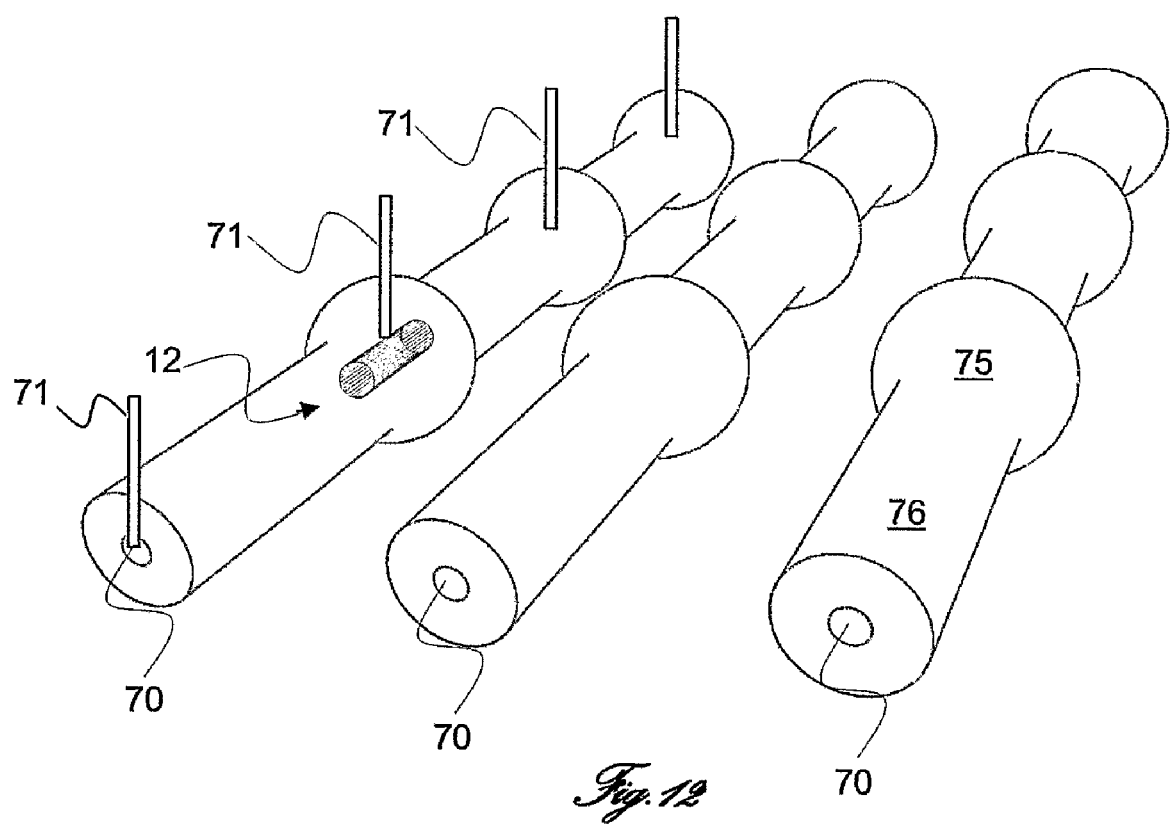
FIG. 12 is a cross-sectional elevated top view of a heat exchanger.

In FIG. 12 water production can be provided for a few centuries, because water membrane filtration is the final use of abandoned spent shale beds. Shale water membrane filtration is provided by passing brackish water through porous activated shale beds stripped into a sphere (water membrane filtration) bed 75 and a stripped tube (water membrane filtration) bed 76 stripped of organics by pressurized hydrogen working gas convection heat desorption and SCFs. Horizontal shale drilling hole 70 enables the total system heat exchanger 12 to be inserted within a borehole 70 where water-jet vertical borehole cuts 71 in the shale provide the intake and exhaust air from aboveground. Horizontal boreholes 70 in shale provide a shale water pipe for centuries of gravitational fed water membrane filtration; recharging potable water through activated spent shale. Several horizontal boreholes can drain potable water into a common transport pipe. Several sets of horizontal boreholes 70 can be structured over each other in parallel positions to provide a cascade filter system and aid in stripping the shale. In thick shale beds these horizontal boreholes 70 can be as large in diameter as large highway automobile tunnels (boreholes 70).

A catalyst, chemical decomposer, scrubbers, and other yet unknown gas, fluids, or powder materials can be forced down hole into space 62 through conduit 50. Adsorption materials can be modified within the heat exchanger to produce any chemical compound that hydrocarbons can produce aboveground.

Figure 13:
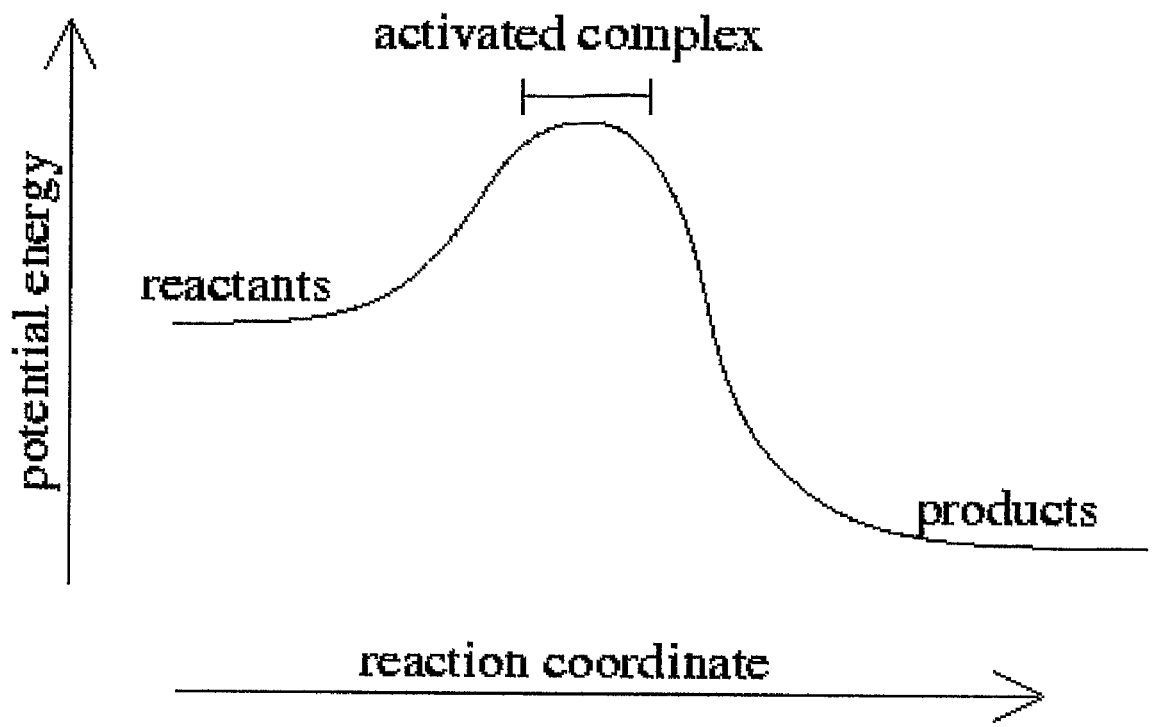
FIG. 13 illustrates a typical chemical reaction profile that produces instances of SCF cells.

In FIG. 13 a typical chemical reaction profile is illustrated. In chemistry an activated complex is a transitional structure in a chemical reaction that results from an effective collision between molecules and that persists while old bonds are breaking and new bonds are forming. It is therefore a range of molecular geometries along the reaction coordinate: When molecules collide, some of their kinetic energy is converted into potential energy within the colliding molecules. If enough energy is converted, the old bonds become sufficiently distorted for the colliding molecules to form an activated complex. New bonds can then begin to form. In this brief interval of bond breakage and bond formation SCF can form, the collision complex is in a transitional state. Some sort of partial bonding exists in this transitional structure. The exact structure of this complex is often difficult to determine, but is important to understanding the mechanism of a reaction that provides SCF within low porosity hydrocarbon formations.

Figure 14:
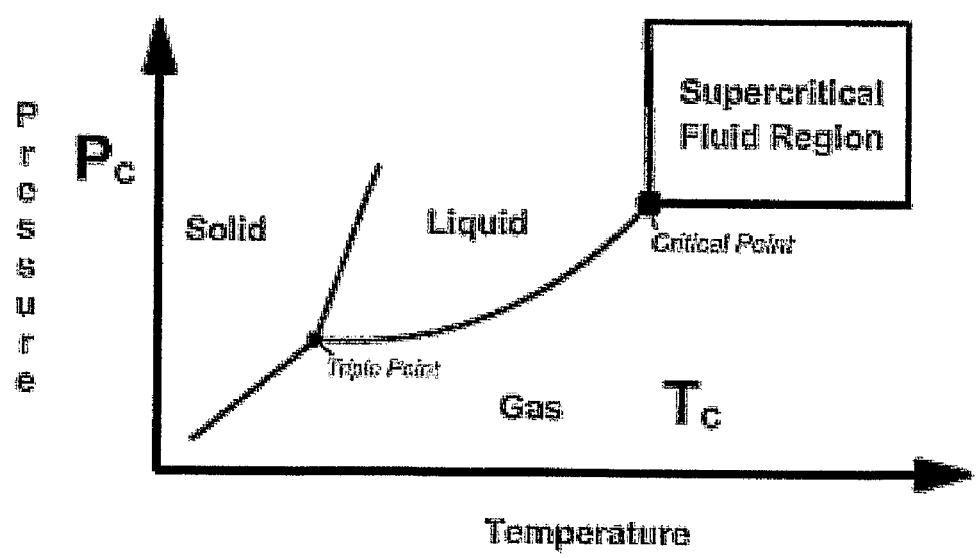
FIG. 14 is a graph illustration of the critical point and pressure and temperature above the critical point where liquid and gas phase into an SCF even in varied densities.

Referring now to the drawings, particularly FIG. 14, the present invention relates to oil and gas recovery applying SCFs. In FIG. 14, the phase boundary between liquid and gas does not continue indefinitely. Instead, it terminates at a point on the phase diagram called the critical point. This reflects the fact that, at extremely high temperatures and pressures, the liquid and gaseous phases become indistinguishable.

Critical variables are useful for rewriting a varied equation of state into one that applies to all materials so chemists can select the best potential SCF.

On a PV diagram, the critical point is an inflection point.

Thus:

$$\left(\frac{\partial P}{\partial V}\right)_C = 0$$

$$\left(\frac{\partial^2 P}{\partial V^2}\right)_C = 0$$

For the van der Waals equation, the above yields:

$$P_C = \frac{a}{27b^2}$$

$$v_C = 3b$$

$$T_C = \frac{8a}{27bR}$$

If any liquid is heated in a sealed system, the liquid expands and the vapor above the liquid becomes denser due to evaporation. If heating is continued or pressure is applied, it is possible to reach the critical point at which the vapor phase is as dense as the liquid phase, and a supercritical phase is achieved. This supercritical phase, at and above the critical point, is unique in having both gas-like and liquid-like properties.

| | | SFC Examples | | |
|---|---|---|---|---|
| Fluid | | $T_c$, °C. | $P_c$, atm | d* |
| Air | — | −140.5 | 37.71 | — |
| Carbon dioxide | $CO_2$ | 31.3 | 72.9 | 0.96 |
| Nitrogen | $N_2$ | −147 | 33.9 | — |
| Nitrous Oxide | $N_2O$ | 36.5 | 72.5 | 0.94 |
| Ammonia | $NH_3$ | 132.5 | 112.5 | 0.40 |
| Methane | $CH_4$ | −82.7 | 45.96 | — |
| Pentane | n-$C_5$ | 196.6 | 33.3 | 0.51 |
| Aliphatic alcohols | n-$C_4$ | 152.0 | 37.5 | 0.50 |
| Dichlorodifluoromethane (R12) | $CCl_2F_2$ | 111.8 | 40.7 | 1.12 |
| Trifluoromethane (R23) | $CHF_3$ | 25.9 | 46.9 | — |
| Water | $H_2O$ | 374 | 220.6 | — |
| Xenon | $X_e$ | 16.5 | 58.4 | — |

*density in g/ml at 400 atm

In chemistry and condensed matter physics, a critical point specifies the conditions (temperature, pressure) at which the liquid state of the matter ceases to exist. As a liquid is heated, its density decreases while the pressure and density of the vapor being formed increases. The liquid and vapor densities become closer and closer to each other until the critical temperature is reached, at which the two densities are equal and the liquid-gas line or phase boundary disappears. The critical point in FIG. 14 phase diagram is at the high-temperature extreme of the liquid-gas phase boundary. SCFs have densities approaching those of liquids together with the mass transport properties of gases. This combination gives them unique properties as solvents for chemical processes. In particular, complete miscibility of gases and substrates can be achieved at relatively high concentrations. The triple point is where gas, liquid, and solids coexist and is typical of brand-new formations that are being drilled into. The triple point is the point at which all hydrocarbon formations are moving toward during declining production (pressure) in a system at rest.

SCFs

These fluids have densities and diffusivities similar to liquids but viscosities comparable to gases.

| Mobile Phase | Density (g/ml) | Viscosity (poise) | Diffusivities (cm²/sec) |
|---|---|---|---|
| Gas | ~$10^{-3}$ | 0.5-3.5 (×$10^{-4}$) | 0.01-1.0 |
| SCF | 0.2-0.9 | 0.2-1.0 (×$10^{-3}$) | 0.1-3.3 (×$10^{-4}$) |
| Liquid | 0.8-1.0 | 0.3-2.4 (×$10^{-2}$) | 0.5-20 (×$10^{-5}$) |

FASTBLOCK® 100 SERIES compounds are ready-to-use, moisture-curable firewall sealants for high-vibration areas. These one-part, non-ablative sealants cure to tough, durable elastomers upon exposure to air. The materials adhere well to metals, composites, paints, and most other common substrates without the use of primers or special surface preparation. Esterline Corporation of Kirkland, Wash. State, USA provides FASTBLOCK® 100 SERIES sealants, which have a paste consistency that makes them effective on vertical and overhead surfaces. 100 SERIES, 300 SERIES and 800 SERIES materials are applied to combine fuel cell elements with intake and exhaust conduit tubing and seals. FAST-BLOCK can be applied to cobalt stainless steel, providing an easy method to bend pipe, coat pipe and maintain pipes to adapt these in-situ fuel cells to down hole heated environments.

In structures of this invention, where FASTBLOCK® will not meet demands, high-strength bonding of dissimilar materials, particularly with high-performance ceramics to low- and high-density metals for in-situ oil refining, chemical processing facilities, petroleum drilling and, and production. TII (TECHNOLOGY INTERNATIONAL, INC., 2103 River Falls Drive, Kingwood, Tex. 77339, Phone: (281) 359-8520, Mr. Robert P. Radtke) bonding technology can be applied to combine materials and systems. TII provides bonding technologies to join metals and ceramics that exhibit a large mismatch in the coefficient of thermal expansion. Brazing, dissimilar materials, initially silicon carbide to titanium alloy Ti-6Al-4V, achieve the minimum attachment shear strength of 2× (76 MPa, 11,000 psi), that of epoxy glues. TII recently developed novel microwave and combustion synthesis methods for brazing polycrystalline diamond and tungsten carbide for commercial abrasive applications.

In FIG. 3, the FuelCell Energy, Inc. Company fuel cell can be applied in this invention. FuelCell Energy manufactures an SOFC that specifies a pressure increase to several atmospheres to provide the fuel. If an SOFC is pressurized, an increased voltage results, leading to improved performance. For example, operation at 3 atmospheres increases the power output by ~10%. However, this improved performance alone may not justify the expenses of pressurization, which require a compressor or hybrid source. During normal operation, air enters the compressor and is compressed to ~3 atmospheres. This compressed air passes through the recuperator, where it is preheated and then enters the SOFC. Pressurized fuel from the fuel pump also enters the SOFC and the electrochemical reactions take place along the cells.

Storing and releasing ammonia safely is important to this invention's success. Requirements: an ammonia storage tank filled with closed-cell foam monolith and a tank capacity of 500 g (1.5 kWhe), an overall volume of 1.2 liters, and a total mass of less than 950 g (including 500 g ammonia). The maximum ammonia release rate will be low enough to minimize safety concerns yet high enough to supply the ammonia based in situ. One commercial source of such a tank is MESO- SYSTEMS TECHNOLOGY, INC. 415 N Quay St., Bldg. A, Suite 5, Kennewick, Wash. 99336. Phone:(509) 222-2002.

ROCKY RESEARCH, 1598 Foothill Dr., P.O. Box 61800, Boulder City, Nev. 89006, phone (702) 293-0851 provides ammonia storage in complex compounds for a safe and compact hydrogen source. Complex compounds absorb ammonia in extremely high storage density. They can release the full ammonia charge at constant pressure and are available with different degrees of vapor pressure suppression for releasing ammonia at variable rates to the hydrocarbon formation in situ. This is very scalable method of delivering large quantities of ammonia or other gases in an adsorption bed.

Figure 15:
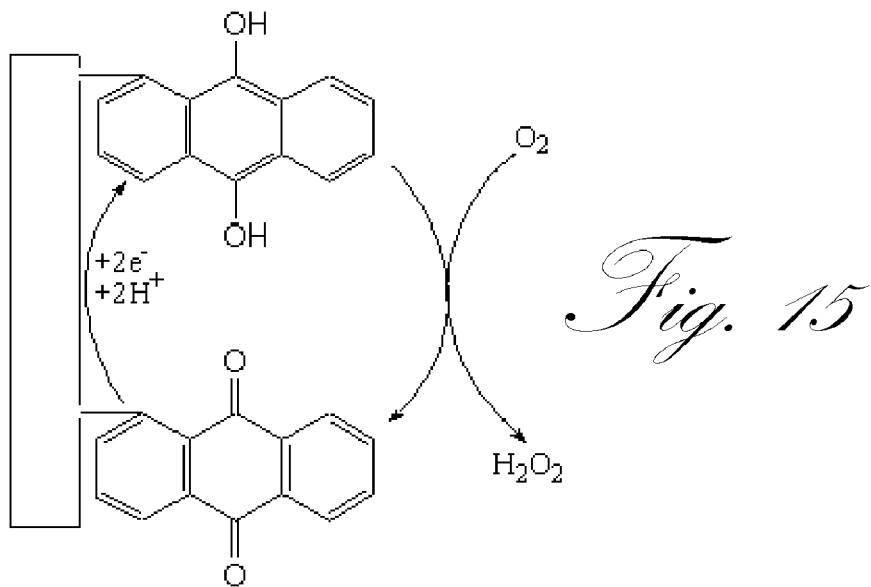
FIG. 15 illustrates the electrochemical synthesis of hydrogen peroxide on anthraquinone-modified electrode.

FIG. 15 illustrates the electrochemical synthesis of hydrogen peroxide on anthraquinone-modified electrode. The reduction of $O_2$ on quinone-modified electrodes proceeds according to the electrochemical-chemical (EC) mechanism:

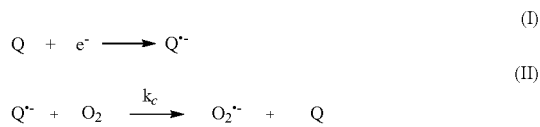

where Q is the attached quinone species. Reaction (II) is the rate-determining step. The one-electron reduction of quinones yields the radical anion ($Q^{\cdot-}$) which reacts with molecular oxygen in the following chemical step to produce the superoxide radical anion ($O_2^{\cdot-}$). The further reduction of $O_2^{-}$ and its catalytic disproportionation are fast and both processes lead to the formation of hydrogen peroxide. This can be varied to match formation.

Preparation of chemicals and energy using electrochemical principles will be provided in situ. Kinetics of oxygen reduction on nanostructured noble metal catalysts and on chemically modified electrodes will provide a high density system for in situ. Nanostructured material is any solid material that has a nanometer (1 nm=$10^{-9}$ m) dimension. Nanoparticles of platinum and other noble metals are used in the preparation of electrodes for fuel cells. The preparation of noble metal catalysts in a highly dispersive form on carbon supports enables to effectively utilize these costly metals in practical devices. A fundamental question is how the electrocatalytic properties of dispersed noble metals depend on the particle size (this is called the "particle size effect").

Major part of the research carried out in the frame of this project is aimed at systematically investigating the effect of particle size on the kinetics of $O_2$ reduction in acid solutions ($HClO_4$, $H_2SO_4$). Noble metal nanoparticles will be prepared on flat carbon substrates which can be considered as a model system for practical electrodes used in the fuel cells. The main advantages of the model system are as follows: nanoparticles on flat substrates are entirely accessible to $O_2$ molecules from solution bulk and the surface characterisation of the model catalysts is easily feasible. The quinones are attached to the surface of carbon substrates by chemical modification. For this purpose, the diazonium salt reduction method and the anodic oxidation of carboxylates could be used. There is a strong practical interest in the study of electrocatalytic properties of surface-bound quinones, because these catalyse the 2-electron reduction of $O_2$ to hydrogen peroxide:

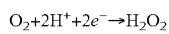

The quinone-modified carbon electrodes are potential candidates for the electrochemical synthesis of hydrogen peroxide. The general scheme for peroxide generation is given by Professor David J. Schiffrin, Centre for Nanoscale Science, Chemistry Department, University of Liverpool, Liverpool L69 7ZD, United Kingdom and available from industrial partner Johnson Matthey.

Figure 16:
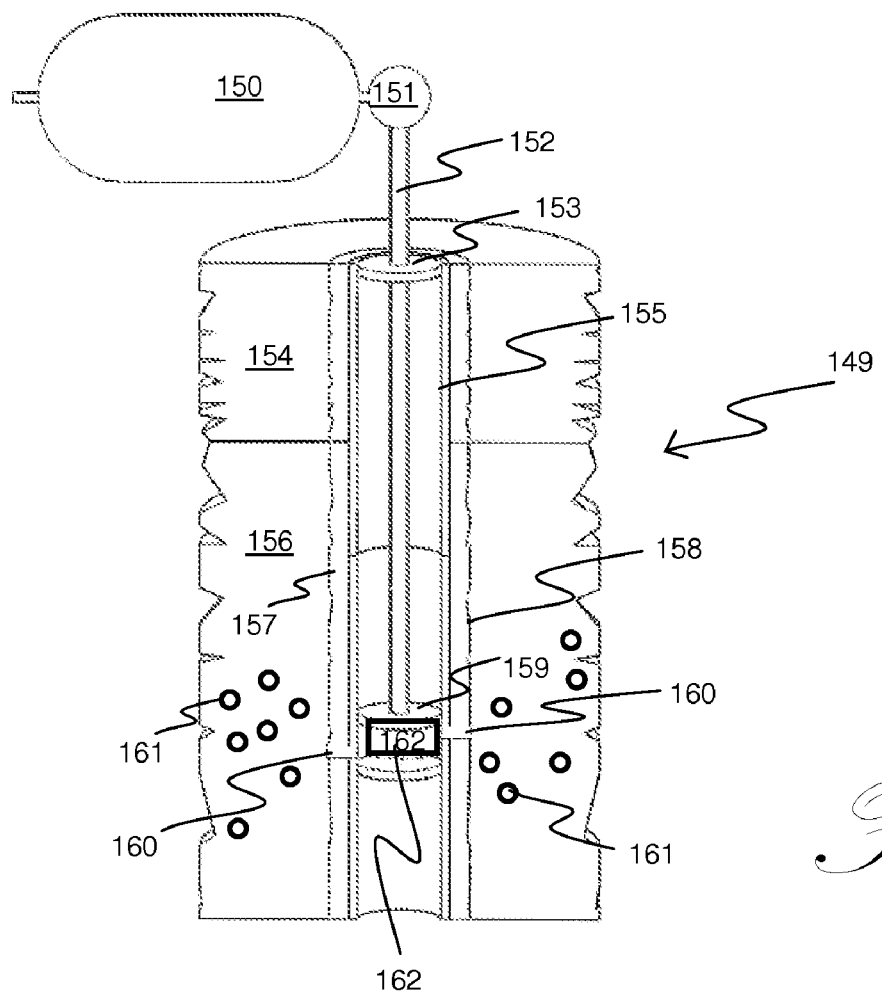
FIG. 16 illustrates a simple ammonia SCF system in a casing cemented in a hydrocarbon formation borehole, which is sealing the outside casing.

FIG. 16 illustrates a simple ammonia SCF system. A bore hole 158 is drilled through an overburden 154 and into a hydrocarbon-bearing formation 156. A casing 155 is cemented in a hydrocarbon-bearing formation 156 bore hole 158, sealing the outside. Inner casing seals 159 hold the gas tube 152 in fluid communication with the perforations 160. Reactant (e.g. anhydrous ammonia, nitrous oxide, or hydrogen peroxide) are compressed in a tank 150 which is released through a regulator 151 and gas tube 152 into the formation to produce SCF events 161. 162 is a fuel cell in FIG. 15, which provides the electrochemical synthesis of hydrogen peroxide on anthraquinone-modified electrodes. Fuel cell 162 provides a safe transportation of water, or hydrogen and oxygen, into the fuel cell in situ providing a safe down hole process away from workers. Ammonia, nitrous oxide, and all other reactants can be provided in situ, by providing fuel cells or catalytic systems in situ as close to the safe delivery hydrocarbon formation as possible. Tubing temperature capability, casing strength, formation depth, moisture, and formation type will determine how close to hydrocarbon-bearing formation the safe chemicals can be converted into reactants for infusion into the hydrocarbon-bearing formation. In FIGS. 5-11 in situ heat exchanger illustrates tubes 50 with port 51, 52, 53, in fluid registration with 51', 52', 53', and 51", 52", 53". Each of the six tubes 50 can have a different fuel cell type, catalysis material, or reformer to process fluids into reactants down hole, or to refine hydrocarbons recovered from hydrocarbon-bearing formations. Dissolved crude fossil fuel enables on-site fuel cell refining.

Figure 17:
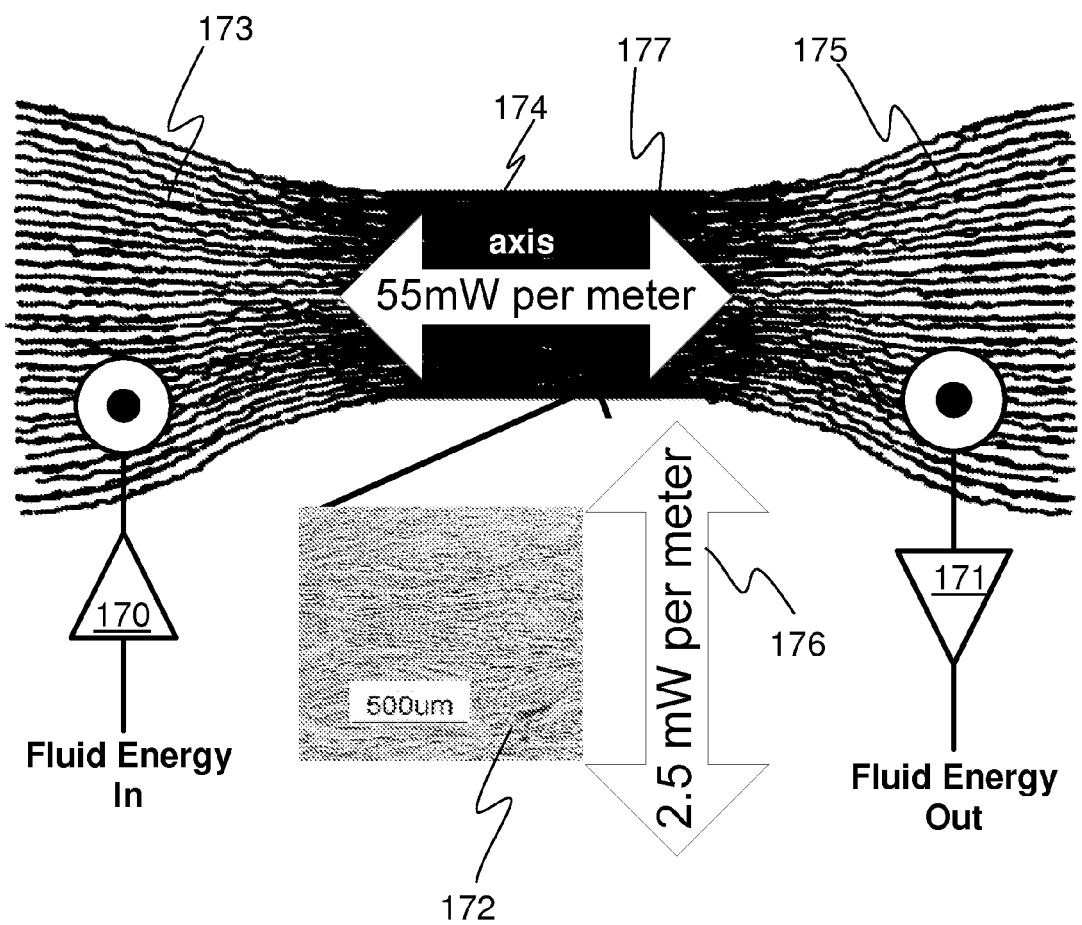
FIG. 17 illustrates a graphite monolithic brick with fibrous ends.

In FIG. 17 graphite monolithic bricks 174 (172) are produced with fibrous ends 173 and 175 spaced for fluid penetration and high surface area contact with fluids, which provide a coated electrode to convert chemical energy into electrical energy and a path to conduct (or store) electrical or thermal energy through the axis 177. The electrical and thermal conductivity in the axial (planar) 177 direction is significantly higher than for conventional graphite. The restitivity in this plane is about 55 mW per meter. The electrical and thermal conductivity in the longitudinal direction 176 is significantly lower than for conventional graphite. In this plane, restitivity is about 2.5 mW per meter. EnergyBrush is a graphite refractory brick with enhanced thermal insulation when the hot fibrous edges are protected from a heat transfer event. Heat storage occurs when heat in fluid is absorbed in 170 the graphite brick's fibrous edges and cannot escape from a face. Colder fluid contacting the hot fibrous edges removes the heat 171 from the brick. Energy is introduced 170 or removed 171 at high surface area "fiber" ends 173 and 175 of graphite brick (monolith). High surface area "fiber" ends 173 and 175 converts SCFs to electrolytes when electrode is cooled in contact with SCFs.

SCFs dissolve/evaporate hydrocarbons to a more refined level in the 1st phase of recovery, making on-site fuel cell assisted refining economic and replacing future large refineries without the objection of "not in my backyard":

Fuel cell elements—fuel, product, proton exchange membrane (PEM), cathode, and anode are operated within SCFs in situ or on site to increase electrical and chemical reaction efficiencies magnitudes more than prior art, operating below the critical point of gas, liquids, and solids.

Portable mass spectrometers can rapidly and accurately measure crude oil to see if SCF events occurred and royalty fees are due: A unique chemical "ID" is present because only SCFs can dissolve HBF solids in situ. Prior SCF art does not teach that "open" porous geologic formations can provide the environment for a SCF event to move hydrocarbons out of the HBFs. SCF oil and gas recovery focuses on breaking down the hydrocarbons in HBFs to produce motive forces with hydrocarbon reactants or inorganic compounds. Gas molecules can travel only short distances in straight lines before high-speed deflection in a new direction by collision with other gas molecules. "Spontaneous" SCF cells form within natural composites of open rocks, clay, and hydrocarbon liquids or solids when gas molecules traveling in a "reaction zone" build pressure and temperature rapidly enough to move above the critical point: Solids dissolve and liquids evaporate at great efficiency even though SCF cell phases last only a few seconds per micro-burst of energy. SCFs form one solution from many natural in situ HBF gas/liquid species and penetrate deep inside all HBFs in the same way, as deep as one scGAS, with nearly 100% penetration. SCFs provide a more economic oil/gas recovery technology in the 1st phase: SCFs dissolve/evaporate hydrocarbons in the 1st phase. Low-energy infusion of hydrocarbon-reactant compounds into hydrocarbon-bearing formations violently react (microbursts of energy) with hydrocarbons, forming "spontaneous" micro-cells of SCFs that dissolve and evaporate hydrocarbons, producing a motive force at great distances from the borehole. Economic benefits of dissolving hydrocarbons are in the 1st phase of oil/gas recovery because of SCFs' unique ability to penetrate near 100% of any HBF, dissolve materials into their components, diffuse solids, and then evaporate liquids into an "internal" global motive force.

Supercritical fluid penetration into hydrocarbon-bearing formations in situ increases hydrocarbon recovery economics in the first phase. This invention teaches direct injection of supercritical fluids into hydrocarbon-bearing formations to remove hydrocarbons from the infusion region of near the down hole casing and then injectioning reactants that will travel great distances for spontaneous reactions with hydrocarbon-bearing formation to form SCFs. Economic benefits of penetrating HBFs with SCFs: Hydrocarbon-reactant infusion has a low energy cost. Motive forces are produced in HBFs at great distances. Near 100% penetration of any natural geologic HBF: Coal, tar-sands, heavy oil, shale, HBFs, and sub-soil remediation A company's fossil fuel reserves can be diversified by SCF economics. Carbon dioxide (CO2) phases into scCO2 (SCF) after it rises in temperature and pressure above its thermodynamic critical point.

Liquids evaporate and solids dissolve at great efficiency even though SCF cell phases last only a few seconds per micro-burst of energy deep within HBFs. The present invention has been described in relation to a preferred embodiment and several alternative preferred embodiments. One of ordinary skill, after reading the foregoing specification, may be able to affect various other changes, alterations, and substitutions or equivalents thereof without departing from the concepts disclosed. It is therefore intended that the scope of the Letters Patent granted hereon be limited only by the definitions contained in the appended claims and equivalents thereof.

I claim:

1. A method for the in-situ recovery of hydrocarbons from hydrocarbon-bearing formations comprising:
    forming a bore hole seal assembly having an elongated substantially cylindrical outer housing,
    providing said elongated bore hole seal assembly with an interior containing a port to an upwardly extending intake air supply line and including in said upwardly extending intake air supply line a minor reactive gas intake regulator and valve,
    drilling two bore holes into a subterranean hydrocarbon-bearing formation,
    lowering said elongated bore hole seal assembly into one of two said bore holes to a position surrounded by the hydrocarbon-bearing formation with said first and second bore holes having been drilled to define a diameter relative to said elongated bore hole seal assembly housing, insuring a close fit there between while providing a gas space between,
    providing a plurality of seal members within said bore hole around said elongated bore hole seal assembly restricting gas leaks, whereby
    supplying a major inert gas to said supply line from gas supply means disposed above ground,
    supplying a minor reactive gas that is reactive to hydrocarbon to said regulator valving in major inert gas air line from gas supply means disposed above ground,
    regulating said major inert gas supply means and said minor reactive gas supply means to progressively and radially infuse gas into surrounding undisturbed hydrocarbon-bearing formation,
    monitoring the hydrocarbon-bearing formations and manipulating said regulation of said gas supply means to maintain supercritical fluid (SCF) gas cell formation in hydrocarbon-bearing formation,
    insuring, during said regulating of said major inert gas supply means and said minor reactive gas supply means, that microbursts of reactive gas form SCF from the major inert gas reacting with hydrocarbons,
    insuring, during said monitoring of the temperature and pressure of the hydrocarbon-bearing formation, that a pressure at over 1 to 7 atmospheres is maintained, whereby,
    collecting the hydrocarbon generated from said first bore hole through said adjacent bore hole near the same hydrocarbon-bearing formation.

2. The method according to claim 1 wherein,
said seals are horizontally located to separate gases.

3. The method according to claim 2 wherein,
said working fluid is nitrogen diamers.

4. The method according to claim 2 wherein,
said working fluid is nitrogen compounds.

5. The method according to claim 4 wherein,
said working fluid is reactive with hydrocarbons.

6. The method according to claim 5 wherein,
said working fluid violently reacts with hydrocarbons in microbursts to instantly compress surrounding inert gas into SCF.

7. The method according to claim 6 wherein,
said SCF saturates hydrocarbons in hydrocarbon-bearing formations followed by an immediate bubbling, energy release, and migration of hydrocarbons out of hydrocarbon-bearing formations.

8. The method according to claim 2 wherein,
said working fluid is nitrogen compound anhydrous ammonia.

9. The method according to claim 2 wherein,
said working fluid is nitrogen compound nitrates.

10. The method according to claim 2 wherein,
said working fluid is nitrogen compound nitrites.

11. The method according to claim 2 wherein,
said working fluid is nitrogen compound azides.

12. A method for the in-situ recovery of hydrocarbons from hydrocarbon-bearing formations comprising:
- forming a heater assembly having an elongated substantially cylindrical outer housing,
- providing said elongated heater assembly with an interior containing a fuel cell therein joined to an upwardly extending intake air supply line and including in said interior an upwardly extending exhaust gas line disposed adjacent an upwardly extending combustion air line,
- drilling a bore hole into a subterranean hydrocarbon-bearing formation,
- lowering said fuel cell assembly into said bore hole to a position surrounded by the hydrocarbon-bearing formation, with said bore hole having been drilled to define a diameter relative to said fuel cell assembly housing insuring a close fit there between while providing a gas space between,
- providing a plurality of seal members within aid bore hole above said heater assembly, whereby
- supplying fuel gas to said fuel gas supply line from fuel gas supply means disposed above ground,
- supplying air to said air line from air supply means disposed above ground,
- regulating said gas supply means and said combustion air supply means to operate said fuel cells in heater assembly and said heater assembly outer housing and thence, through convection and radiation, to progressively and radially heat the surrounding undisturbed hydrocarbon-bearing formation,
- monitoring the temperature of the heated hydrocarbon-bearing formations and manipulating said regulating of said supply means to maintain the temperature of the heated hydrocarbon-bearing formations at approximately 1200° F. to 1800° F.,
- insuring, during said regulating of said gas supply means and said air supply means, that a temperature of over 150° C. is maintained,
- insuring, during said monitoring of the temperature of the heated hydrocarbon-bearing bed formation, that a temperature in the range of 150° C. to 1371° C. and gas pressure at 3 to 7 atmospheres is maintained, whereby,
- collecting the hydrocarbon generated gases from said bore hole through said fuel cell line and
- natural gas within said bore hole is precluded from exiting said bore hole other than through said fuel cells.

* * * * *